(12) United States Patent
He et al.

(10) Patent No.: US 12,049,170 B2
(45) Date of Patent: Jul. 30, 2024

(54) ADAPTIVE REARVIEW MIRROR ADJUSTMENT METHOD AND APPARATUS

(71) Applicant: Huawei Technologies Co., Ltd., Shenzhen (CN)

(72) Inventors: Yanshan He, Shenzhen (CN); Wei Huang, Munich (DE); Wenkang Xu, Shenzhen (CN); Junhao Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 17/489,112

(22) Filed: Sep. 29, 2021

(65) Prior Publication Data

US 2022/0017014 A1    Jan. 20, 2022

Related U.S. Application Data

(63) Continuation of application No. PCT/CN2020/103362, filed on Jul. 21, 2020.

(30) Foreign Application Priority Data

Aug. 31, 2019    (CN) .......................... 201910830441.7

(51) Int. Cl.
*B60R 1/07* (2006.01)
*B60R 1/072* (2006.01)
(Continued)

(52) U.S. Cl.
CPC .............. *B60R 1/072* (2013.01); *G06F 3/013* (2013.01); *G06T 7/11* (2017.01); *G06T 7/70* (2017.01);
(Continued)

(58) Field of Classification Search
CPC combination set(s) only.
See application file for complete search history.

(56) References Cited

U.S. PATENT DOCUMENTS

| 4,896,954 A | 1/1990 | Swanson |
| 9,073,493 B1 | 7/2015 | Yun et al. |

(Continued)

FOREIGN PATENT DOCUMENTS

| CN | 101628559 A | 1/2010 | |
| CN | 101277432 B * | 7/2012 | ............. B60Q 9/008 |

(Continued)

*Primary Examiner* — Mary Cheung
(74) *Attorney, Agent, or Firm* — Conley Rose, P.C.

(57) ABSTRACT

An adaptive rearview mirror adjustment method includes obtaining a spatial position of a human eye of a driver of a current vehicle and a spatial position of a target rearview mirror, obtaining a horizontal field of view of the driver in the target rearview mirror based on the spatial position of the human eye of the driver and a spatial position of a target rearview mirror, obtaining a next-vehicle image, obtaining a first auxiliary angle of a target next vehicle based on the next-vehicle image, calculating a second auxiliary angle based on the horizontal field of view, the spatial position of the human eye, and the position of the target rearview mirror, obtaining a horizontal adjustment angle of the target rearview mirror based on the first auxiliary angle and the second auxiliary angle, and adjusting a horizontal angle of the target rearview mirror based on the horizontal adjustment angle.

20 Claims, 11 Drawing Sheets

(51) Int. Cl.
    *G06F 3/01*         (2006.01)
    *G06T 7/11*         (2017.01)
    *G06T 7/70*         (2017.01)
    *G06V 20/58*      (2022.01)
    *G06V 20/59*      (2022.01)
    *G06V 40/19*      (2022.01)

(52) U.S. Cl.
    CPC ............ *G06V 20/584* (2022.01); *G06V 20/59* (2022.01); *G06V 40/19* (2022.01); *G06T 2207/20021* (2013.01); *G06T 2207/30201* (2013.01); *G06T 2207/30252* (2013.01); *G06T 2207/30268* (2013.01)

(56) References Cited

U.S. PATENT DOCUMENTS

| | | | |
|---|---|---|---|
| 2005/0111117 A1 | 5/2005 | Qualich et al. | |
| 2009/0310237 A1 | 12/2009 | Shin et al. | |
| 2010/0017071 A1 | 1/2010 | Ryu et al. | |
| 2016/0243988 A1* | 8/2016 | Peterson | B60R 1/0617 |
| 2017/0001567 A1 | 1/2017 | Koyama et al. | |

FOREIGN PATENT DOCUMENTS

| | | | | |
|---|---|---|---|---|
| CN | 103507718 A | | 1/2014 | |
| CN | 203713705 U | | 7/2014 | |
| CN | 203793213 U | | 8/2014 | |
| CN | 104228688 A | | 12/2014 | |
| CN | 104590130 A | | 5/2015 | |
| CN | 105793111 A | | 7/2016 | |
| CN | 106379242 A | | 2/2017 | |
| CN | 106394408 A | | 2/2017 | |
| CN | 106427788 A | | 2/2017 | |
| CN | 206217761 U | | 6/2017 | |
| CN | 107139927 A | | 9/2017 | |
| CN | 107323347 A | | 11/2017 | |
| CN | 107415832 A | * | 12/2017 | ............... B60R 1/06 |
| CN | 108045308 A | | 5/2018 | |
| CN | 106004663 B | * | 6/2018 | ............... B60R 1/00 |
| CN | 109421599 A | | 3/2019 | |
| CN | 110228418 A | * | 9/2019 | ............... B60R 1/04 |
| JP | 2015140070 A | | 8/2015 | |
| JP | 2016135640 A | | 7/2016 | |
| KR | 101154018 B1 | | 6/2012 | |
| KR | 101480914 B1 | | 1/2015 | |

* cited by examiner

ADAPTIVE REARVIEW MIRROR ADJUSTMENT METHOD AND APPARATUS

CROSS-REFERENCE TO RELATED APPLICATIONS

This application is a continuation of International Application No. PCT/CN2020/103362, filed on Jul. 21, 2020, which claims priority to Chinese Patent Application No. 201910830441.7, filed on Aug. 31, 2019. The disclosures of the aforementioned applications are hereby incorporated by reference in their entireties.

TECHNICAL FIELD

The present application relates to the field of intelligent vehicles, and in particular, to an adaptive rearview mirror adjustment method and apparatus.

BACKGROUND

Artificial intelligence (AI) is a theory, a method, a technology, and an application system that use a digital computer or a machine controlled by a digital computer to simulate, extend, and expand human intelligence, sense an environment, obtain knowledge, and obtain an optimal result with knowledge. In other words, artificial intelligence is a branch of computer science that seeks to understand the essence of intelligence and produce a new intelligent machine that can react in a way similar to human intelligence. Artificial intelligence is to study design principles and implementation methods of various intelligent machines, to enable the machines to have functions of perception, inference, and decision making. Researches in the field of artificial intelligence include robots, natural language processing, computer vision, decision-making and inference, man-machine interaction, recommendation and search, AI basic theories, and the like.

Automated driving is a mainstream application in the field of artificial intelligence. With an automated driving technology, a motor vehicle is enabled in collaboration with computer vision, radar, a monitoring apparatus, a global positioning system, and the like to drive automatically without active operations of a human. Self-driving vehicles use various computing systems to help carry passengers from one position to another position. Some self-driving vehicles may require some initial or continuous input from an operator (such as a navigator, a driver, or a passenger). The self-driving vehicles allow the operator to switch from a manual operating mode to an automated driving mode or a mode between the manual operation operating mode and the automated driving mode. Since the automated driving technology does not require humans to drive motor vehicles, theoretically, driving mistakes made by humans can be effectively avoided to reduce traffic accidents, and transportation efficiency on roads can be improved. Therefore, the automated driving technology has been attached more importance.

During driving, to ensure safety and reduce blind spots, a driver needs to manually adjust a rearview mirror based on a view of the driver, a driving status, an outside-vehicle scene, and the like. However, real-time manual adjustment performed by the driver on the rearview mirror during driving is distracting and inefficient, and affects driving safety.

SUMMARY

Embodiments of this application provide an adaptive rearview mirror adjustment method and apparatus. According to the embodiments of this application, impact on driving safety when a driver manually adjusts a rearview mirror during driving is avoided, and driving safety performance is improved.

According to a first aspect, an embodiment of this application provides an adaptive rearview mirror adjustment method, including obtaining a spatial position of a human eye of a driver of a current vehicle and a spatial position of a target rearview mirror, and obtaining a horizontal field of view of the driver in the target rearview mirror based on the spatial position of the human eye and the spatial position of the target rearview mirror; obtaining a next-vehicle image, and obtaining a first auxiliary angle of a target next vehicle based on the next-vehicle image, where the first auxiliary angle is obtained based on the next-vehicle image and a first reference point, the first reference point is a point on the target rearview mirror, the next-vehicle image is obtained by a rearview camera, and the next-vehicle image includes the target next vehicle; calculating a second auxiliary angle based on the horizontal field of view, the spatial position of the human eye, and the position of the target rearview mirror; obtaining a horizontal adjustment angle of the target rearview mirror based on the first auxiliary angle and the second auxiliary angle; and adjusting a horizontal angle of the target rearview mirror based on the horizontal adjustment angle.

Optionally, the first reference point may be a center point on the target rearview mirror, and a second reference point may also be the center point on the target rearview mirror.

It should be noted herein that the horizontal field of view is an angle formed between a straight line passing through a virtual mirror point and a point on a left boundary of the target rearview mirror and a straight line passing through the virtual mirror point and a point on a right boundary of the target rearview mirror, and the virtual mirror point is a symmetry point of the spatial position of the human eye using the target rearview mirror as a symmetry axis.

According to this embodiment, the horizontal angle of the rearview mirror is adjusted based on a view of the driver and an outside-vehicle scene. Compared with conventional rearview mirror adjustment, this embodiment uses an adaptive adjustment manner, which does not require manual adjustment, thereby avoiding impact on driving safety when the driver is distracted by manual adjustment of the rearview mirror.

In an embodiment, the first auxiliary angle is an angle formed between a first straight line and a second straight line, the first straight line is a straight line passing through the target next vehicle and the first reference point, and the second straight line is a straight line that passes through the first reference point and that is perpendicular to the target rearview mirror; and the second auxiliary angle is an angle formed between a third straight line and a center line of a horizontal view, the third straight line is a straight line passing through the position of the human eye of the driver and a second reference point, the second reference point is an intersection between the center line of the horizontal view and a mirror surface of the target rearview mirror, and the center line of the horizontal view is an angle bisector of the horizontal field of view.

In an embodiment, the next-vehicle image includes M vehicles, M is an integer greater than or equal to 1, and the determining a first auxiliary angle of a target next vehicle based on the next-vehicle image includes obtaining a vehicle box and an offset of a next vehicle A based on the next-vehicle image, where the offset is a distance between a center position of a front face of the next vehicle A in the next-vehicle image and a longitudinal center line of the next-vehicle image, and the vehicle box is a quantity of pixels occupied by a contour of the next vehicle A in the next-vehicle image; obtaining a vehicle distance d based on the offset and the vehicle box of the next vehicle A, where the vehicle distance d is a distance between the front face of the next vehicle A and a rear of the current vehicle; and obtaining a third auxiliary angle of the next vehicle A based on the vehicle distance d and the offset of the next vehicle A, where the third auxiliary angle is an angle formed between a fourth straight line and a transverse center line of the current vehicle, and the fourth straight line is a straight line passing through a position of the rearview camera and the center position of the front face of the next vehicle A; and when M=1, and the next vehicle A is the target next vehicle, obtaining the first auxiliary angle of the target next vehicle based on a third auxiliary angle and a vehicle distance d of the target next vehicle; or when M is greater than 1, and the next vehicle A is an $i^{th}$ vehicle of the M next vehicles, where i=1, 2, . . . , or M, obtaining an importance probability of the $i^{th}$ next vehicle based on a third auxiliary angle and a vehicle box of the $i^{th}$ next vehicle, determining a next vehicle with the highest importance probability as the target vehicle, and obtaining the first auxiliary angle of the target next vehicle based on a third auxiliary angle and a vehicle distance d of the target next vehicle.

When there is a plurality of next vehicles, according to the method in this embodiment, the driver of the current vehicle may determine a next vehicle that needs to be focused on in the plurality of next vehicles, to adjust an angle of the rearview mirror of the current vehicle such that the driver can observe a noteworthy vehicle at any time through the rearview mirror, thereby ensuring vehicle driving safety.

In an embodiment, the obtaining a vehicle distance d based on the offset and the vehicle box of the next vehicle A includes searching a first relationship table based on the offset and the vehicle box of the next vehicle A, to obtain the vehicle distance d of the next vehicle A, where the vehicle distance d of the next vehicle A is a distance corresponding to the offset and the vehicle box of the next vehicle A, and the first relationship table is a table of a correspondence between an offset as well as a vehicle box and a distance; and the obtaining a third auxiliary angle of the next vehicle A based on the vehicle distance d and the offset of the next vehicle A includes searching a second relationship table based on the vehicle distance d and the offset of the next vehicle A, to obtain the third auxiliary angle of the next vehicle A, where the third auxiliary angle of the next vehicle A is a third auxiliary angle corresponding to the vehicle distance d and the offset of the next vehicle A, and the second relationship table is a table of a correspondence between a distance as well as an offset and a third auxiliary angle.

The vehicle distance d and the third auxiliary angle can be quickly obtained by searching the tables such that the horizontal adjustment angle of the target rearview mirror is quickly determined.

In an embodiment, the obtaining the first auxiliary angle of the target next vehicle based on a third auxiliary angle and a vehicle distance d of the target next vehicle includes searching a third relationship table based on the third auxiliary angle and the vehicle distance d of the target next vehicle, to obtain a first auxiliary angle corresponding to the third auxiliary angle and the vehicle distance d of the target next vehicle, where the first auxiliary angle corresponding to the third auxiliary angle and the vehicle distance d of the target next vehicle is the first auxiliary angle of the target next vehicle, and the third relationship table is a table of a correspondence between a third auxiliary angle as well as a vehicle distance d and a first auxiliary angle. The first auxiliary angle of the target next vehicle can be quickly determined by searching the table such that the adjustment angle of the target rearview mirror can be quickly determined.

In an embodiment, the obtaining a vehicle box of a next vehicle A based on the next-vehicle image includes performing median filtering on the next-vehicle image to obtain a filtered image; performing edge detection on the filtered image based on a canny edge detection algorithm, to obtain an edge detection result; and obtaining the contour of the next vehicle A from the edge detection result based on a haar operator, and calculating the quantity of pixels in the contour of the next vehicle A.

In an embodiment, the obtaining an importance probability of the $i^{th}$ next vehicle based on a third auxiliary angle and a vehicle box of the $i^{th}$ next vehicle includes searching a fourth relationship table based on the third auxiliary angle and the vehicle box of the $i^{th}$ next vehicle, to obtain an importance probability corresponding to the third auxiliary angle and the vehicle box of the $i^{th}$ next vehicle, where the importance probability corresponding to the third auxiliary angle and the vehicle box of the $i^{th}$ next vehicle is the importance probability of the $i^{th}$ next vehicle, and the fourth relationship table is a table of a correspondence between a third auxiliary angle as well as a vehicle box and an importance probability.

In an embodiment, the obtaining a horizontal adjustment angle of the target rearview mirror based on the first auxiliary angle and the second auxiliary angle includes searching a fifth relationship table based on the first auxiliary angle and the second auxiliary angle, to obtain a horizontal adjustment angle corresponding to the first auxiliary angle and the second auxiliary angle, where the horizontal adjustment angle corresponding to the first auxiliary angle and the second auxiliary angle is the horizontal adjustment angle of the target rearview mirror, and the fifth relationship table is a table of a correspondence between a first auxiliary angle as well as a second auxiliary angle and a horizontal adjustment angle.

According to a second aspect, an embodiment of this application provides an adaptive rearview mirror adjustment method, including obtaining a spatial position of a human eye of a driver and a spatial position of a target rearview mirror of a current vehicle, and obtaining a vertical field of view based on the spatial position of the human eye and the spatial position of the target rearview mirror; calculating an auxiliary adjustment angle of the current vehicle based on the spatial position of the human eye of the driver and the vertical field of view; obtaining a next-vehicle image captured by a rearview camera of the current vehicle, and obtaining a sky-to-ground ratio R based on the next-vehicle image; and obtaining a vertical adjustment angle of the target rearview mirror based on the auxiliary adjustment angle of the current vehicle and the sky-to-ground ratio R, and adjusting the target rearview mirror to a target vertical angle based on the vertical adjustment angle.

It should be noted herein that the vertical field of view is an angle formed between a straight line passing through a virtual mirror point and a point on an upper boundary of the target rearview mirror and a straight line passing through the virtual mirror point and a point on a lower boundary of the target rearview mirror, and the virtual mirror point is a symmetry point of the spatial position of the human eye using the target rearview mirror as a symmetry axis.

According to this embodiment, a vertical angle of the rearview mirror is adjusted based on a view of the driver and an outside-vehicle scene such that the driver can observe a driving status of a next vehicle at any time through the rearview mirror. Compared with conventional rearview mirror adjustment, this embodiment uses an adaptive adjustment manner, which does not require manual adjustment, thereby avoiding impact on driving safety when the driver is distracted by manual adjustment of the rearview mirror.

In an embodiment, the auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

In an embodiment, the obtaining a sky-to-ground ratio R based on the next-vehicle image includes dividing the next-vehicle image longitudinally into a plurality of image strips; obtaining a target image strip from the plurality of image strips, where the target image strip is an image strip with continuous transition between sky and ground in the plurality of image strips; counting a quantity of pixels occupied by the sky and a quantity of pixels occupied by the ground in the target image strip; and calculating the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, the obtaining a vertical adjustment angle of the target rearview mirror based on the auxiliary adjustment angle of the current vehicle and the sky-to-ground ratio R includes searching an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio R and a vertical adjustment angle. The vertical adjustment angle of the target rearview mirror can be quickly determined by searching the table.

According to a third aspect, an embodiment of this application provides an adaptive rearview mirror adjustment method, including obtaining a next-vehicle image captured by a rearview camera of a current vehicle; converting the next-vehicle image into a grayscale image, and calculating an average value of pixels in the grayscale image; and if the average value is not less than a preset value, obtaining a spatial position of a human eye of a driver of the current vehicle and a spatial position of a target rearview mirror of the current vehicle, and obtaining a vertical field of view based on the spatial position of the human eye and the spatial position of the target rearview mirror; calculating an auxiliary adjustment angle of the current vehicle based on the spatial position of the human eye of the driver and the vertical field of view; obtaining a sky-to-ground ratio R based on the next-vehicle image; and obtaining a vertical adjustment angle of the target rearview mirror based on the auxiliary adjustment angle of the current vehicle and the sky-to-ground ratio R, and adjusting the target rearview mirror to a target vertical angle based on the vertical adjustment angle.

It should be noted herein that the vertical field of view is an angle formed between a straight line passing through a virtual mirror point and a point on an upper boundary of the target rearview mirror and a straight line passing through the virtual mirror point and a point on a lower boundary of the target rearview mirror, and the virtual mirror point is a symmetry point of the spatial position of the human eye using the target rearview mirror as a symmetry axis.

It should be noted herein that for a dark night or an extreme weather condition (for example, weather with low visibility such as heavy fog, heavy rain, or heavy snow), the sky-to-ground ratio R cannot be obtained based on the next-vehicle image. Therefore, when the next-vehicle image is used, it needs to detect the next-vehicle image to determine whether the sky-to-ground ratio R can be obtained. If the sky-to-ground ratio R cannot be obtained using the next-vehicle image, the target rearview mirror is adjusted based on a gradient at which the current vehicle is currently driving.

According to this embodiment, the vertical angle of the rearview mirror is adjusted based on a view of the driver and an outside-vehicle scene or based on a gradient of a current driving road such that the driver can observe a status behind the current vehicle at any time through the rearview mirror. Compared with conventional rearview mirror adjustment, this embodiment uses an adaptive adjustment manner, which does not require manual adjustment, thereby avoiding impact on driving safety when the driver is distracted.

In an embodiment, the auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

In an embodiment, the obtaining a sky-to-ground ratio R based on the next-vehicle image includes dividing the next-vehicle image longitudinally into a plurality of image strips; obtaining a target image strip from the plurality of image strips, where the target image strip is an image strip with continuous transition between sky and ground in the plurality of image strips; counting a quantity of pixels occupied by the sky and a quantity of pixels occupied by the ground in the target image strip; and calculating the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, the obtaining a vertical adjustment angle of the target rearview mirror based on the auxiliary adjustment angle of the current vehicle and the sky-to-ground ratio R includes searching an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio and a vertical adjustment angle. The vertical adjustment angle of the target rearview mirror can be quickly determined by searching the table.

In an embodiment, if the average value is less than the preset value, the adaptive rearview mirror adjustment method further includes obtaining a gradient of a road on which the current vehicle drives within preset duration; determining a driving status of the current vehicle based on the gradient of the road on which the current vehicle drives within the preset duration; and adjusting a vertical angle of the target rearview mirror to a target vertical angle based on the driving status of the current vehicle and a gradient β, where the gradient β is an absolute value of a gradient of a road on which the current vehicle is currently driving.

In an embodiment, the determining a vertical adjustment angle based on the driving status of the current vehicle and a gradient β includes, when the driving status of the current vehicle is a flat ground driving state, adjusting the target vertical angle to a preset angle θ; when the driving status of the current vehicle is a long downhill driving state, adjusting the target vertical angle to the preset angle θ; when the driving status of the current vehicle is a reaching-downhill driving state, adjusting the target vertical angle to θ−β/2; when the driving status of the current vehicle is a leaving-downhill driving state, adjusting the target vertical angle to θ+β/2; when the driving status of the current vehicle is a long uphill driving state, adjusting the target vertical angle to the preset angle θ; when the driving status of the current vehicle is a reaching-uphill driving state, adjusting the target vertical angle to θ−β/2; and when the driving status of the current vehicle is a leaving-uphill driving state, adjusting the target vertical angle to θ+β/2.

According to a fourth aspect, an embodiment of this application provides an adaptive rearview mirror adjustment apparatus, including an obtaining module, a calculation module, and an adjustment module.

The obtaining module is configured to obtain a spatial position of a human eye of a driver of a current vehicle and a spatial position of a target rearview mirror, and obtain a horizontal field of view of the driver in the target rearview mirror based on the spatial position of the human eye and the spatial position of the target rearview mirror; and obtain a next-vehicle image, and obtain a first auxiliary angle of a target next vehicle based on the next-vehicle image, where the first auxiliary angle is obtained based on the next-vehicle image and a first reference point, the first reference point is a point on the target rearview mirror, the next-vehicle image is obtained by a rearview camera, and the next-vehicle image includes the target next vehicle.

The calculation module is configured to calculate a second auxiliary angle based on the horizontal field of view, the spatial position of the human eye, and the position of the target rearview mirror.

The obtaining module is further configured to obtain a horizontal adjustment angle of the target rearview mirror based on the first auxiliary angle and the second auxiliary angle.

The adjustment module is configured to adjust a horizontal angle of the target rearview mirror based on the horizontal adjustment angle.

In an embodiment, the first auxiliary angle is an angle formed between a first straight line and a second straight line, the first straight line is a straight line passing through the target next vehicle and the first reference point, and the second straight line is a straight line that passes through the first reference point and that is perpendicular to the target rearview mirror; and the second auxiliary angle is an angle formed between a third straight line and a center line of a horizontal view, the third straight line is a straight line passing through the position of the human eye of the driver and a second reference point, the second reference point is an intersection between the center line of the horizontal view and a mirror surface of the target rearview mirror, and the center line of the horizontal view is an angle bisector of the horizontal field of view.

In an embodiment, the next-vehicle image includes M vehicles, M is an integer greater than or equal to 1, and in an aspect of obtaining the first auxiliary angle of the target next vehicle based on the next-vehicle image, the obtaining module is configured to obtain a vehicle box and an offset of a next vehicle A based on the next-vehicle image, where the offset is a distance between a center position of a front face of the next vehicle A in the next-vehicle image and a longitudinal center line of the next-vehicle image, and the vehicle box is a quantity of pixels occupied by a contour of the next vehicle A in the next-vehicle image; obtain a vehicle distance d based on the offset and the vehicle box of the next vehicle A, where the vehicle distance d is a distance between the front face of the next vehicle A and a rear of the current vehicle; and obtain a third auxiliary angle of the next vehicle A based on the vehicle distance d and the offset of the next vehicle A, where the third auxiliary angle is an angle formed between a fourth straight line and a transverse center line of the current vehicle, and the fourth straight line is a straight line passing through a position of the rearview camera and the center position of the front face of the next vehicle A; and when M=1, and the next vehicle A is the target next vehicle, obtain the first auxiliary angle of the target next vehicle based on a third auxiliary angle and a vehicle distance d of the target next vehicle; or when M is greater than 1, and the next vehicle A is an $i^{th}$ vehicle of the M next vehicles, where i=1, 2, . . . , or M, obtain an importance probability of the $i^{th}$ next vehicle based on a third auxiliary angle and a vehicle box of the $i^{th}$ next vehicle, determine a next vehicle with the highest importance probability as the target vehicle, and obtain the first auxiliary angle of the target next vehicle based on a third auxiliary angle and a vehicle distance d of the target next vehicle.

In an embodiment, in an aspect of obtaining the vehicle distance d based on the offset and the vehicle box of the next vehicle A, the obtaining module is configured to search a first relationship table based on the offset and the vehicle box of the next vehicle A, to obtain the vehicle distance d of the next vehicle A, where the vehicle distance d of the next vehicle A is a distance corresponding to the offset and the vehicle box of the next vehicle A, and the first relationship table is a table of a correspondence between an offset as well as a vehicle box and a distance; and in an aspect of obtaining the third auxiliary angle of the next vehicle A based on the vehicle distance d and the offset of the next vehicle A, the obtaining module is configured to search a second relationship table based on the vehicle distance d and the offset of the next vehicle A, to obtain the third auxiliary angle of the next vehicle A, where the third auxiliary angle of the next vehicle A is a third auxiliary angle corresponding to the vehicle distance d and the offset of the next vehicle A, and the second relationship table is a table of a correspondence between a distance as well as an offset and a third auxiliary angle.

In an embodiment, in an aspect of obtaining the first auxiliary angle of the target next vehicle based on the third auxiliary angle and the vehicle distance d of the target next vehicle, the obtaining module is configured to search a third relationship table based on the third auxiliary angle and the vehicle distance d of the target next vehicle, to obtain a first auxiliary angle corresponding to the third auxiliary angle and the vehicle distance d of the target next vehicle, where the first auxiliary angle corresponding to the third auxiliary angle and the vehicle distance d of the target next vehicle is the first auxiliary angle of the target next vehicle, and the third relationship table is a table of a correspondence between a third auxiliary angle as well as a vehicle distance d and a first auxiliary angle.

In an embodiment, in an aspect of obtaining the vehicle box of the next vehicle Abased on the next-vehicle image, the obtaining module is configured to perform median filtering on the next-vehicle image to obtain a filtered image; perform edge detection on the filtered image based on a canny edge detection algorithm, to obtain an edge detection result; and obtain the contour of the next vehicle A from the edge detection result based on a haar operator, and calculate the quantity of pixels in the contour of the next vehicle A.

In an embodiment, in an aspect of obtaining the importance probability of the $i^{th}$ next vehicle based on the third auxiliary angle and the vehicle box of the $i^{th}$ next vehicle, the obtaining module is configured to search a fourth relationship table based on the third auxiliary angle and the vehicle box of the $i^{th}$ next vehicle, to obtain an importance probability corresponding to the third auxiliary angle and the vehicle box of the $i^{th}$ next vehicle, where the importance probability corresponding to the third auxiliary angle and the vehicle box of the $i^{th}$ next vehicle is the importance probability of the $i^{th}$ next vehicle, and the fourth relationship table is a table of a correspondence between a third auxiliary angle as well as a vehicle box and an importance probability.

In an embodiment, in an aspect of obtaining the horizontal adjustment angle of the target rearview mirror based on the first auxiliary angle and the second auxiliary angle, the obtaining module is configured to search a fifth relationship table based on the first auxiliary angle and the second auxiliary angle, to obtain a horizontal adjustment angle corresponding to the first auxiliary angle and the second auxiliary angle, where the horizontal adjustment angle corresponding to the first auxiliary angle and the second auxiliary angle is the horizontal adjustment angle of the target rearview mirror, and the fifth relationship table is a table of a correspondence between a first auxiliary angle as well as a second auxiliary angle and a horizontal adjustment angle.

According to a fifth aspect, an embodiment of this application provides an adaptive rearview mirror adjustment apparatus, including an obtaining module, a calculation module, and an adjustment module.

The obtaining module is configured to obtain a spatial position of a human eye of a driver and a spatial position of a target rearview mirror of a current vehicle, and obtain a vertical field of view based on the spatial position of the human eye and the spatial position of the target rearview mirror.

The calculation module is configured to calculate an auxiliary adjustment angle of the current vehicle based on the spatial position of the human eye of the driver and the vertical field of view.

The obtaining module is further configured to obtain a next-vehicle image captured by a rearview camera of the current vehicle, and obtain a sky-to-ground ratio R based on the next-vehicle image; and obtain a vertical adjustment angle of the target rearview mirror based on the auxiliary adjustment angle of the current vehicle and the sky-to-ground ratio R.

The adjustment module is configured to adjust the target rearview mirror to a target vertical angle based on the vertical adjustment angle.

In an embodiment, the auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

In an embodiment, in an aspect of obtaining the sky-to-ground ratio R based on the next-vehicle image, the obtaining module is configured to divide the next-vehicle image longitudinally into a plurality of image strips; obtain a target image strip from the plurality of image strips, where the target image strip is an image strip with continuous transition between sky and ground in the plurality of image strips; count a quantity of pixels occupied by the sky and a quantity of pixels occupied by the ground in the target image strip; and calculate the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, in an aspect of obtaining the vertical adjustment angle of the target rearview mirror based on the auxiliary adjustment angle of the current vehicle and the sky-to-ground ratio R, the obtaining module is configured to search an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio and a vertical adjustment angle.

According to a sixth aspect, an embodiment of this application provides an adaptive rearview mirror adjustment apparatus, including an obtaining module, a calculation module, and an adjustment module.

The obtaining module is configured to obtain a next-vehicle image captured by a rearview camera of a current vehicle.

The calculation module is configured to convert the next-vehicle image into a grayscale image, and calculate an average value of pixels in the grayscale image.

The obtaining module is further configured to, if the average value is not less than a preset value, obtain a spatial position of a human eye of a driver of the current vehicle and a spatial position of a target rearview mirror of the current vehicle, and obtain a vertical field of view based on the spatial position of the human eye and the spatial position of the target rearview mirror.

The calculation module is further configured to calculate an auxiliary adjustment angle of the current vehicle based on the spatial position of the human eye of the driver and the vertical field of view.

The obtaining module is further configured to obtain a sky-to-ground ratio R based on the next-vehicle image; and obtain a vertical adjustment angle of the target rearview mirror based on the auxiliary adjustment angle of the current vehicle and the sky-to-ground ratio R.

The adjustment module is configured to adjust the target rearview mirror to a target vertical angle based on the vertical adjustment angle.

In an embodiment, the auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

In an embodiment, in an aspect of obtaining the sky-to-ground ratio R based on the next-vehicle image, the obtaining module is configured to divide the next-vehicle image longitudinally into a plurality of image strips; obtain a target image strip from the plurality of image strips, where the target image strip is an image strip with continuous transition between sky and ground in the plurality of image strips; count a quantity of pixels occupied by the sky and a quantity of pixels occupied by the ground in the target image strip; and calculate the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, in an aspect of obtaining the vertical adjustment angle of the target rearview mirror based on the auxiliary adjustment angle of the current vehicle and the sky-to-ground ratio R, the obtaining module is configured to search an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio R and a vertical adjustment angle.

In an embodiment, if the average value is less than the preset value, the obtaining module is further configured to obtain a gradient of a road on which the current vehicle drives within preset duration; and determine a driving status of the current vehicle based on the gradient of the road on which the current vehicle drives within the preset duration; and the adjustment module is further configured to adjust a vertical angle of the target rearview mirror to a target vertical angle based on the driving status of the current vehicle and a gradient $\beta$, where the gradient $\beta$ is an absolute value of a gradient of a road on which the current vehicle is currently driving.

In a possible design, the adjustment module is configured to when the driving status of the current vehicle is a flat ground driving state, adjust the target vertical angle to a preset angle $\theta$; when the driving status of the current vehicle is a long downhill driving state, adjust the target vertical angle to the preset angle $\theta$; when the driving status of the current vehicle is a reaching-downhill driving state, adjust the target vertical angle to $\theta-\beta/2$; when the driving status of the current vehicle is a leaving-downhill driving state, adjust the target vertical angle to $\theta+\beta/2$; when the driving status of the current vehicle is a long uphill driving state, adjust the target vertical angle to the preset angle $\theta$; when the driving status of the current vehicle is a reaching-uphill driving state, adjust the target vertical angle to $\theta-\beta/2$; and when the driving status of the current vehicle is a leaving-uphill driving state, adjust the target vertical angle to $\theta+\beta/2$.

According to a seventh aspect, an embodiment of this application provides an adaptive rearview mirror adjustment apparatus, including a memory configured to store a program; and a processor configured to execute the program stored in the memory. When the program stored in the memory is executed, the processor is configured to perform at least one method in the first aspect, the second aspect, and the third aspect.

According to an eighth aspect, a computer-readable medium is provided. The computer-readable medium stores program code executed by a device, and the program code includes instructions used to perform at least one method in the first aspect, the second aspect, and the third aspect.

According to a ninth aspect, a computer program product including an instruction is provided. When the computer program product is run on a computer, the computer is enabled to perform at least one method in the first aspect, the second aspect, and the third aspect.

According to a tenth aspect, a chip is provided. The chip includes a processor and a data interface, and the processor reads, through the data interface, an instruction stored in a memory, to perform at least one method in the first aspect, the second aspect, and the third aspect.

Optionally, in an implementation, the chip may further include the memory, the memory stores the instruction, the processor is configured to execute the instruction stored in the memory, and when the instruction is executed, the processor is configured to perform at least one method in the first aspect, the second aspect, and the third aspect.

According to an eleventh aspect, an electronic device is provided. The electronic device includes the apparatus in at least one of the fourth aspect to the sixth aspect.

These aspects or other aspects of the present application are clearer and easier to understand in the following descriptions of embodiments.

BRIEF DESCRIPTION OF DRAWINGS

To describe the technical solutions in the embodiments of the present application, the following briefly describes the accompanying drawings for describing the embodiments. The accompanying drawings in the following description show merely some embodiments of the present application, and a person of ordinary skill in the art may derive other drawings from these accompanying drawings without creative efforts.

DESCRIPTION OF EMBODIMENTS

The following describes the embodiments of this application with reference to accompanying drawings.

Figure 1:
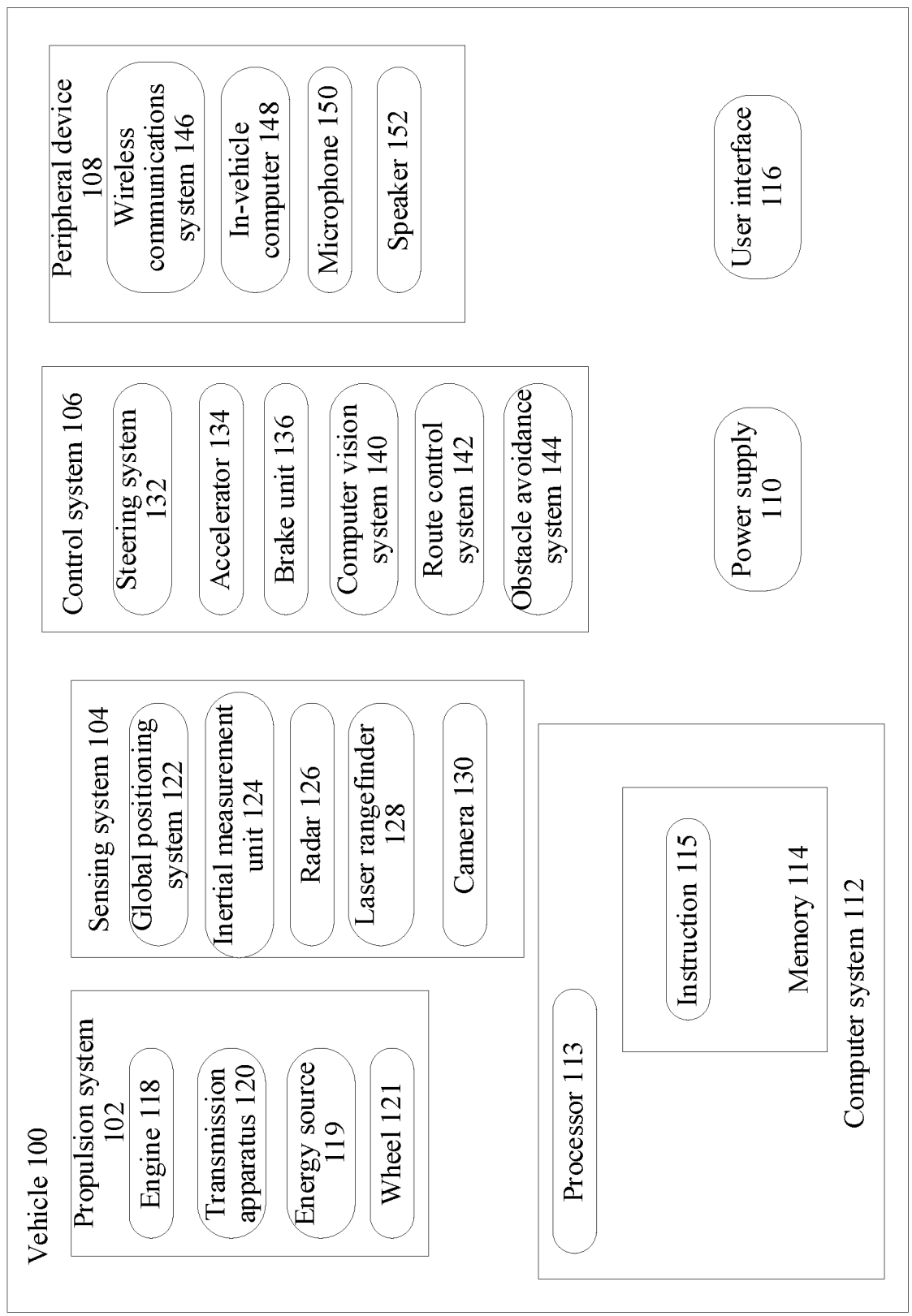
FIG. 1 is a schematic structural diagram of a self-driving vehicle according to an embodiment of this application.

FIG. 1 is a functional block diagram of a vehicle 100 according to an embodiment of the present application. In an embodiment, the vehicle 100 is configured in a full or partial self-driving mode. For example, the vehicle 100 may control itself when in the self-driving mode, and a manual operation may be performed to determine a current status of the vehicle and a surrounding environment of the vehicle, determine possible behavior of at least one another vehicle in the surrounding environment, determine a confidence level corresponding to a possibility that the other vehicle performs the possible behavior, and control the vehicle 100 based on the determined information. When the vehicle 100 is in the self-driving mode, the vehicle 100 may be configured to operate without interacting with a person.

The vehicle 100 may include various subsystems, such as a propulsion system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, all subsystems and elements of the vehicle 100 may be interconnected in a wired or wireless manner.

The propulsion system 102 may include a component that provides power motion for the vehicle 100. In an embodiment, the propulsion system 102 may include an engine 118, an energy source 119, a transmission apparatus 120, and a wheel/tire 121. The engine 118 may be an internal combustion engine, an electric motor, an air compression engine, or a combination of engines of other types, such as a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other petroleum-based fuels, propane, other compressed gas-based fuels, anhydrous alcohol, solar panels, batteries, and other power sources. The energy source 119 may also provide energy to other systems of the vehicle 100.

The transmission apparatus 120 may transfer mechanical power from the engine 118 to the wheel 121. The transmission apparatus 120 may include a gearbox, a differential, and a drive shaft. In an embodiment, the transmission apparatus 120 may further include another component, such as a clutch. The drive shaft may include one or more shafts that may be coupled to one or more wheels 121.

The sensor system 104 may include several sensors for sensing information about the surrounding environment of the vehicle 100. For example, the sensor system 104 may include a positioning system 122 (the positioning system may be a GPS system, or may be a BeiDou system or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) for monitoring internal systems of the vehicle 100. Sensor data from one or more of these sensors may be used to detect an object and corresponding characteristics (a position, a shape, a direction, a speed, and the like) of the object. Such detection and identification are key functions of safe operation of the autonomous vehicle 100.

The positioning system 122 may be configured to estimate a geographic position of the vehicle 100. The IMU 124 is configured to sense changes in position and orientation of the vehicle 100 based on inertial acceleration. In an embodiment, the IMU 124 may be a combination of an accelerometer and a gyroscope.

The radar 126 may sense an object within the surrounding environment of the vehicle 100 using a radio signal. In some embodiments, in addition to sensing the object, the radar 126 may be further configured to sense a speed and/or a heading direction of the object.

The laser rangefinder 128 may sense, using laser, an object in an environment in which the vehicle 100 is located. In some embodiments, the laser rangefinder 128 may include one or more laser sources, a laser scanner, one or more detectors, and other system components.

The camera 130 may be configured to capture a plurality of images of the surrounding environment of the vehicle 100. The camera 130 may be a static camera or a video camera.

The control system 106 controls operations of the vehicle 100 and components of the vehicle. The control system 106 may include various elements, including a steering system 132, an accelerator 134, a brake unit 136, a sensor fusion algorithm 138, a computer vision system 140, a route control system 142, and an obstacle avoidance system 144.

The steering system 132 may be operated to adjust a heading direction of the vehicle 100, for example, may be a steering wheel system in an embodiment.

The accelerator 134 is configured to control an operating speed of the engine 118 to control a speed of the vehicle 100.

The braking unit 136 is configured to control the vehicle 100 to decelerate. The brake unit 136 may slow the wheel 121 using friction. In other embodiments, the braking unit 136 may convert kinetic energy of the wheel 121 into an electric current. The braking unit 136 may alternatively slow a rotational speed of the wheel 121 by another form to control the speed of the vehicle 100.

The computer vision system 140 may be operated to process and analyze an image captured by the camera 130, to recognize an object and/or a feature in the surrounding environment of the vehicle 100. The object and/or the feature may include a traffic signal, a road boundary, and an obstacle. The computer vision system 140 may use an object recognition algorithm, a structure from motion (SFM) algorithm, video tracking, and other computer vision technologies. In some embodiments, the computer vision system 140 may be configured to map an environment, track an object, estimate a speed of an object, and the like.

The route control system 142 is configured to determine a driving route of the vehicle 100. In some embodiments, the route control system 142 may determine a driving route for the vehicle 100 with reference to data from sensors 138, the GPS 122, and one or more predetermined maps.

The obstacle avoidance system 144 is configured to recognize, evaluate, and avoid or otherwise bypass a potential obstacle in the environment of the vehicle 100.

In an example, the control system 106 may additionally or alternatively include components other than those shown and described. In an example, some of the components shown above may be omitted.

The vehicle 100 interacts with an external sensor, another vehicle, another computer system, or a user through the peripheral device 108. The peripheral device 108 may include a wireless communications system 146, an in-vehicle computer 148, a microphone 150, and/or a speaker 152.

In some embodiments, the peripheral device 108 provides means for the user of the vehicle 100 to interact with the user interface 116. For example, the in-vehicle computer 148 may provide information to the user of the vehicle 100. The user interface 116 may further receive user input through the in-vehicle computer 148. The in-vehicle computer 148 may be operated using a touchscreen. In other cases, the peripheral device 108 may provide means for the vehicle 100 to communicate with other devices located in the vehicle. For example, the microphone 150 may receive audio (for example, a voice command or other audio input) from the user of the vehicle 100. Similarly, the speaker 152 may output audio to the user of the vehicle 100.

The wireless communications system 146 may communicate with one or more devices directly or through a communications network. For example, the wireless communications system 146 may use 3G cellular communication such as Code-Division Multiple Access (CDMA), Evolution-Data Optimized (EVDO), or Global System for Mobile Communications (GSM)/General Packet Radio Service (GPRS), fourth generation (4G) cellular communication such as Long-Term Evolution (LTE), or fifth generation (5G) cellular communication. The wireless communications system 146 may communicate with a wireless local area network (WLAN) using Wi-Fi. In some embodiments, the wireless communications system 146 may directly communicate with a device using an infrared link, BLUETOOTH, or ZIGBEE. The wireless communications system 146 may alternatively use other wireless protocols, for example, various vehicle communications systems. For example, the wireless communications system 146 may include one or more dedicated short range communications (DSRC) devices, and these devices may include public and/or private data communication between vehicles and/or roadside stations.

The power supply 110 may provide power to various components of the vehicle 100. In an embodiment, the power supply 110 may be a rechargeable lithium-ion or lead-acid battery. One or more battery packs of such a battery may be configured as a power supply to provide power to various components of the vehicle 100. In some embodiments, the power supply 110 and the energy source 119 may be implemented together, for example, as implemented in some all-electric vehicles.

Some or all functions of the vehicle 100 are controlled by the computer system 112. The computer system 112 may include at least one processor 113. The processor 113 executes instructions 115 stored in a non-transient computer-readable medium such as a data storage apparatus 114. The computer system 112 may alternatively be a plurality of computing devices that control individual components or subsystems of the vehicle 100 in a distributed manner.

The processor 113 may be any conventional processor, such as a commercially available central processing unit (CPU). Alternatively, the processor may be a special-purpose device such as an application-specific integrated circuit (ASIC) or other hardware-based processors. Although FIG. 1 functionally illustrates the processor, the memory, and other elements of the computer 112 in a same block, a person of ordinary skill in the art should understand that the processor, the computer, or the memory may include a plurality of processors, computers, or memories that may or may not be located in a same physical housing. For example, the memory may be a hard disk drive, or another storage medium located in a housing different from that of the computer 112. Therefore, a reference to the processor or the computer will be understood as including a reference to a set of processors, computers, or memories that may or may not operate in parallel. Unlike using a single processor to perform steps described herein, some components such as a steering component and a deceleration component may each have an own processor, and the processor performs only computing related to a function specific to the component.

In various aspects described herein, the processor may be located away from the vehicle and wirelessly communicate with the vehicle. In other aspects, some of the processes described herein are performed by a processor arranged in the vehicle, and others are performed by a remote processor, including performing a step mandatory to a single manipulation.

In some embodiments, the data storage apparatus 114 may include the instruction 115 (for example, program logic), and the instruction 115 may be executed by the processor 113 to perform various functions of the vehicle 100, including functions described above. The data storage apparatus 114 may further include additional instructions, including instructions for sending data to, receiving data from, interacting with, and/or controlling one or more of the propulsion system 102, the sensor system 104, the control system 106, and the peripheral device 108.

In addition to the instruction 115, the data storage apparatus 114 may further store data such as a road map, route information, a position, a direction, and a speed of the vehicle, other such vehicle data, and other information. Such information may be used by the vehicle 100 and the computer system 112 during operation of the vehicle 100 in an autonomous, semi-autonomous, and/or manual mode.

The camera 130 may include a driver monitoring system (DMS) camera, a cockpit monitoring system (CMS) camera, and a rearview camera configured to acquire a next-vehicle image. The DMS camera is configured to acquire an image of a head of a driver. The CMS camera is configured to acquire an image of an interior of the vehicle driven by the driver, and the image displays the head of the driver. The processor 113 obtains a spatial position of a human eye of the driver based on the image obtained by the DMS camera and the image obtained by the CMS camera.

For horizontal adjustment of a rearview mirror, the processor 113 obtains a horizontal field of view of the driver in the rearview mirror based on the spatial position of the human eye of the driver and a spatial position of the rearview mirror, obtains a first auxiliary angle based on the next-vehicle image, obtains a second auxiliary angle based on the horizontal field of view, the spatial position of the human eye, and the spatial position of the rearview mirror, and finally, obtains a horizontal adjustment angle based on the first auxiliary angle and the second auxiliary angle, and adjusts a horizontal angle of the rearview mirror based on the horizontal adjustment angle.

For a vertical adjustment angle, the processor 113 obtains a vertical field of view of the driver in the rearview mirror based on the spatial position of the human eye of the driver and the spatial position of the rearview mirror, and obtains an auxiliary adjustment angle based on the vertical field of view, the spatial position of the human eye, and the spatial position of the rearview mirror. The processor 113 obtains a sky-to-ground ratio R based on the next-vehicle image, and then obtains the vertical adjustment angle based on the sky-to-ground ratio R and the auxiliary adjustment angle. Finally, the processor 113 adjusts a vertical angle of the rearview mirror to a target vertical angle based on the vertical adjustment angle. When the sky-to-ground ratio R cannot be obtained, the gyroscope obtains a gradient of a road on which the current vehicle drives within preset duration, and the processor 113 obtains a driving status of the current vehicle based on the gradient within the preset duration, and then adjusts the vertical adjustment angle of the rearview mirror based on the driving status of the current vehicle and a gradient of a road on which the current vehicle is driving at a current moment.

The user interface 116 is configured to provide information to or receive information from the user of the vehicle 100. Optionally, the user interface 116 may include one or more input/output devices within a set of peripheral devices 108, such as the wireless communications system 146, the in-vehicle computer 148, the microphone 150, and the speaker 152.

The computer system 112 may control a function of the vehicle 100 based on input received from various subsystems (for example, the propulsion system 102, the sensor system 104, and the control system 106) and the user interface 116. For example, the computer system 112 may control the steering unit 132 using input from the control system 106, to avoid an obstacle detected by the sensor system 104 and the obstacle avoidance system 144. In some embodiments, the computer system 112 may be operated to provide control over many aspects of the vehicle 100 and subsystems of the vehicle.

Optionally, one or more of these components may be installed separately from or associated with the vehicle 100. For example, the data storage apparatus 114 may be partially or completely separated from the vehicle 100. The components may be communicatively coupled in a wired and/or wireless manner.

Optionally, the components are merely examples. In an example application, a component may be added to or deleted from components in the foregoing modules based on requirements. FIG. 1 should not be construed as a limitation on the embodiments of the present application.

A self-driving vehicle driving on a road, such as the vehicle 100, may recognize an object within a surrounding environment of the vehicle to determine an adjustment to a current speed. The object may be another vehicle, a traffic control device, or objects of other types. In some examples, each recognized object may be considered independently and the speed adjustment that the self-driving vehicle is to be made may be determined based on a respective characteristic of the object, such as a current speed and acceleration of the object and a distance between the object and the vehicle.

Optionally, the self-driving vehicle 100 or a computing device (such as the computer system 112, the computer vision system 140, and the data storage apparatus 114 in FIG. 1) associated with the self-driving vehicle 100 may predict behavior of the recognized object based on the characteristic of the recognized object and a status (for example, traffic, rain, or road ice) of the surrounding environment. Optionally, all the recognized object depends on behavior of each other, and therefore, all the recognized objects may be considered together to predict behavior of a single recognized object. The vehicle 100 can adjust the speed of the vehicle based on the predicted behavior of the recognized object. In other words, the self-driving vehicle can determine, based on the predicted behavior of the object, a specific stable state to which the vehicle needs to be adjusted (for example, accelerate, decelerate, or stop). In this process, other factors, such as a transverse position of the vehicle 100 on a driving road, a curvature of the road, and proximity to static and dynamic objects, may also be considered to determine the speed of the vehicle 100.

In addition to providing an instruction for adjusting the speed of the self-driving vehicle, the computing device may provide an instruction for modifying a steering angle of the vehicle 100 so that the self-driving vehicle follows a given trajectory and/or maintains safe transverse and longitudinal distances from an object (for example, a car in an adjacent lane on the road) next to the self-driving vehicle.

The vehicle 100 may be a car, a truck, a motorcycle, a bus, a boat, an aircraft, a helicopter, a lawn mower, an entertainment vehicle, a playground vehicle, construction equipment, a trolley, a golf cart, a train, a trolley, or the like, which is not particularly limited in the embodiments of the present application.

It should be noted herein that the adjustment of the rearview mirror of the vehicle includes adjustment in a left-right direction and adjustment in a vertical direction. The following describes an adjustment manner of the rearview mirror in the left-right direction.

Figure 2:
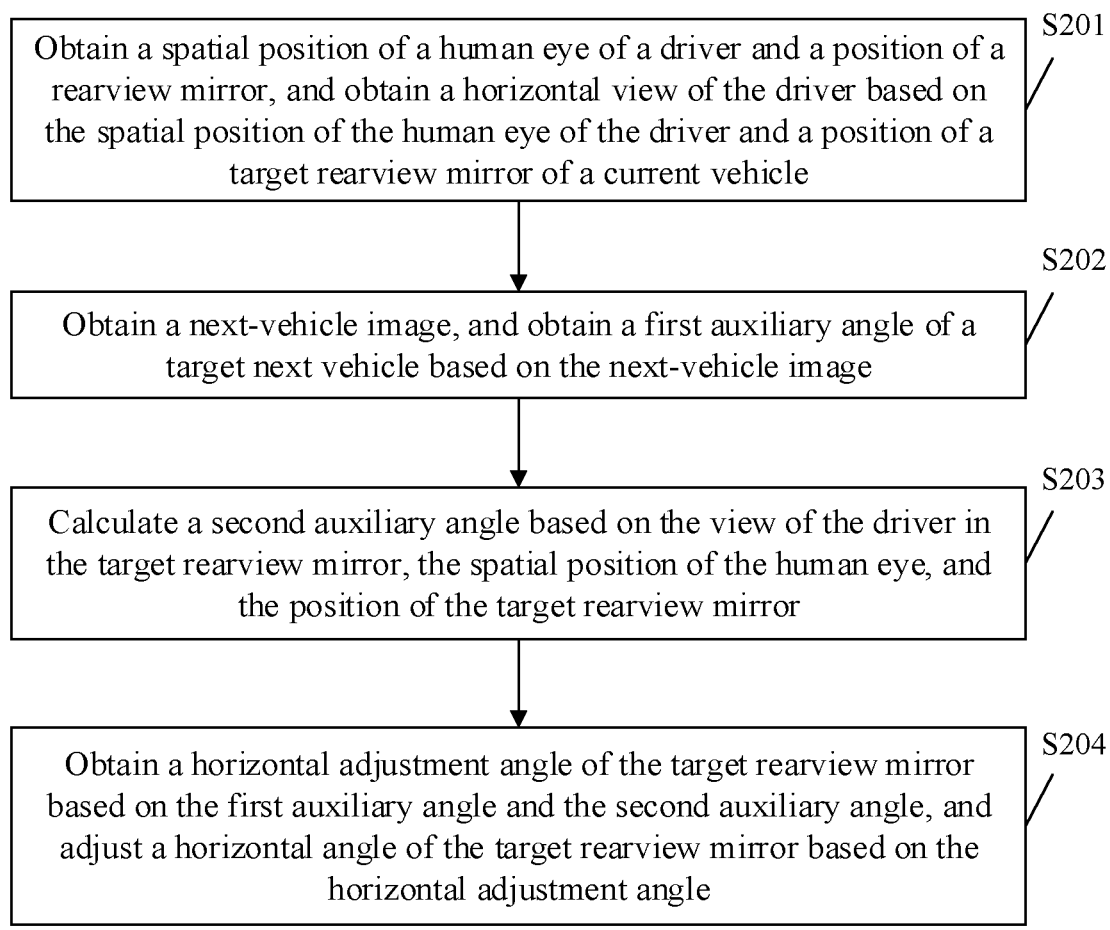
FIG. 2 is a schematic flowchart of an adaptive rearview mirror adjustment method according to an embodiment of this application.

FIG. 2 is a schematic flowchart of an adaptive rearview mirror adjustment method according to an embodiment of the present application. As shown in FIG. 2, the method includes the following steps.

S201: Obtain a spatial position of a human eye of a driver and a position of a rearview mirror, and obtain a horizontal view of the driver based on the spatial position of the human eye of the driver and a position of a target rearview mirror of a current vehicle.

A driver monitoring system (DMS) camera and a cockpit monitoring system (CMS) camera are configured on the vehicle driven by the driver. The DMS camera is configured to acquire an image of a head of the driver. The CMS camera is configured to acquire an image of an interior of the vehicle driven by the driver, and the image displays the head of the driver.

Optionally, the spatial position of the human eye of the driver may be obtained using the image obtained by the DMS camera, or the spatial position of the human eye of the driver may be obtained using the image obtained by the DMS camera and the image obtained by the CMS camera.

The following describes in detail how to obtain the spatial position of the human eye of the driver using the image obtained by the DMS camera and the image obtained by the CMS camera.

In an example, intrinsic parameter matrices and extrinsic parameter matrices of the DMS camera and the CMS camera are obtained, positions $P_1$ and $P_2$ of an eye are respectively detected in the image obtained by the DMS camera and the image obtained by the CMS camera, spatial straight lines $O_1P_1$, $O_2P_2$ on which the eye is located are calculated with reference to the intrinsic parameter matrices and the extrinsic parameter matrices of the DMS camera and the CMS camera, and finally, a spatial point P of the eye is obtained based on the spatial straight lines $O_1P_1$, $O_2P_2$. The spatial point P of the eye is an intersection of the spatial straight lines $O_1P_1$, $O_2P_2$. Spatial positions of left and right eyes of the driver are obtained based on the method, and then the spatial positions of the left and right eyes of the driver are averaged to obtain the spatial position of the human eye of the driver.

The intrinsic and extrinsic parameter matrices of the two cameras are obtained to establish position and direction relationships between the cameras and between the camera and another object in space based on intrinsic and extrinsic parameters.

Figure 3:
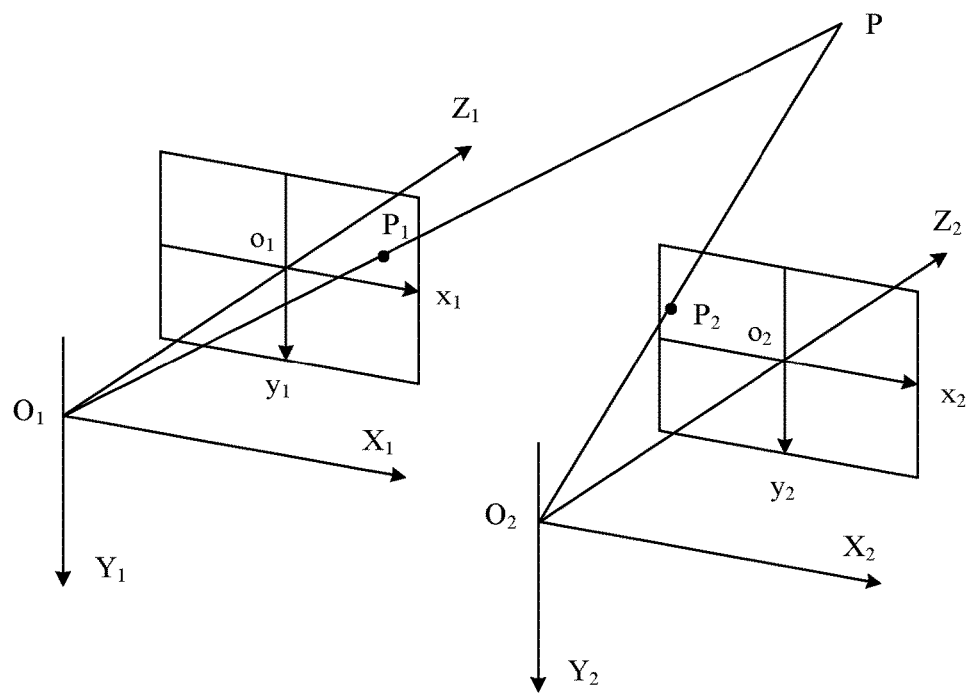
FIG. 3 is a schematic principle diagram of obtaining a spatial position of a human eye.

In a specific example, intrinsic parameter matrices and extrinsic parameter matrices calibrated for the DMS camera and the CMS camera before delivery are obtained using a camera calibration method, and then 2D position coordinates $p_1$ and $p_2$ of an eye in the image obtained by the DMS camera and the image obtained by the CMS camera are detected through deep learning or another algorithm. Then, spatial straight lines $O_1P_1$, $O_2P_2$ on which the eye is located are calculated with reference to the calibrated intrinsic parameter matrices and extrinsic parameter matrices of the DMS camera and the CMS camera. As shown in FIG. 3, 2D positions $p_1$ and $p_2$ of the eye are converted into spatial coordinates $P_1$ and $P_2$ based on intrinsic/extrinsic parameters of the cameras. $O_1$ and $O_2$ are optical origins of the DMS camera and the CMS camera in space, and are respectively recorded in the extrinsic parameter matrices of the two cameras. Next, spatial straight lines $O_1P_1$, $O_2P_2$ on which the eye is located may be calculated based on the spatial coordinates $P_1$ and $P_2$ as well as $O_1$ and $O_2$. Finally, an intersection of the spatial straight lines $O_1P_1$, $O_2P_2$ on which the eye is located is determined as a spatial point of the eye. If the spatial straight lines $O_1P_1$, $O_2P_2$ on which the eye is located do not intersect, a point closest to the two straight lines is selected as a spatial point P of the eye.

Spatial positions of left and right eyes of the driver are obtained based on the method, and then the spatial positions of the left and right eyes of the driver are averaged to obtain the spatial position of the human eye of the driver.

After the spatial position of the human eye of the driver is obtained, the position of the target rearview mirror of the current vehicle is obtained, and then a horizontal field of view of the driver is determined based on the spatial position of the human eye of the driver and the position of the target rearview mirror.

Figure 4:
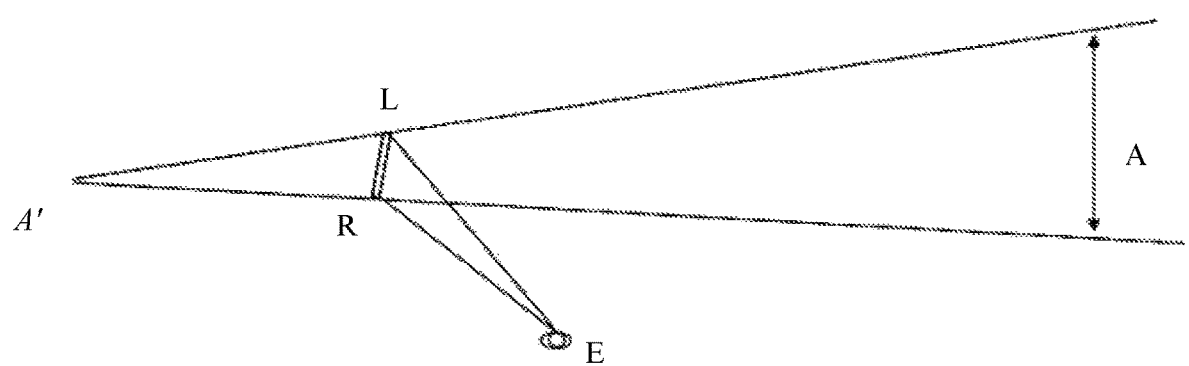
FIG. 4 is a schematic diagram of a horizontal view of a driver in a rearview mirror according to an embodiment of this application.

As shown in FIG. 4, E is a spatial position of a human eye of a driver, R and L are respectively a left boundary point and a right boundary point of a right rearview mirror of a current vehicle, and A' is a symmetry point of the point E using a straight line RL as a symmetry axis. ∠LA'R is a horizontal field of view of the driver, and A is a view of the driver.

S202: Obtain a next-vehicle image, and obtain a first auxiliary angle of a target next vehicle based on the next-vehicle image.

The next-vehicle image is obtained by a rearview camera of the current vehicle, and the rearview camera is configured to obtain an image of a vehicle driving behind the current vehicle.

Optionally, the rearview camera may be located at any position on a rear of the current vehicle, for example, a center position of an upper boundary or a lower boundary of a license plate, or a position such as an upper left corner, a lower left corner, an upper right corner, or a lower right corner on the rear of the vehicle.

It should be noted herein that the next-vehicle image may include vehicles driving in a plurality of lanes behind the vehicle.

In an embodiment, the next-vehicle image includes M next vehicles, and the determining a first auxiliary angle of a target next vehicle based on the next-vehicle image includes obtaining a vehicle box and an offset of a next vehicle A based on the next-vehicle image, where the offset is a distance between a center position of a front face of the next vehicle A in the next-vehicle image and a longitudinal center line of the next-vehicle image, and the vehicle box is a quantity of pixels occupied by a contour of the next vehicle A in the next-vehicle image; obtaining a vehicle distance d based on the offset and the vehicle box of the next vehicle A, where the vehicle distance d is a distance between the front face of the next vehicle A and a rear of the current vehicle; and obtaining a third auxiliary angle of the next vehicle A based on the vehicle distance d and the offset of the next vehicle A, where the third auxiliary angle is an angle formed between a fourth straight line and a transverse center line of the current vehicle, and the fourth straight line is a straight line passing through a position of the rearview camera and the center position of the front face of the next vehicle A; and when M=1, and the next vehicle A is the target next vehicle, obtaining the first auxiliary angle of the target next vehicle based on a third auxiliary angle and a vehicle distance d of the target next vehicle; or when M is greater than 1, and the next vehicle A is an $i^{th}$ vehicle of the M next vehicles, where i=1, 2, . . . , or M, obtaining an importance probability of the $i^{th}$ next vehicle based on a third auxiliary angle and a vehicle box of the $i^{th}$ next vehicle, determining a next vehicle with the highest importance probability as the target vehicle, and obtaining the first auxiliary angle of the target next vehicle based on a third auxiliary angle and a vehicle distance d of the target next vehicle.

The importance probability is used to represent a degree of importance of the next vehicle, or a degree of attention that needs to be paid by the driver to the next vehicle. A larger vehicle box of the next vehicle and a smaller third auxiliary angle indicate a higher importance probability of the next vehicle. A higher importance probability of the next vehicle indicates a higher degree of importance of the next vehicle, or a higher degree of attention that needs to be paid by the driver to the next vehicle.

When there are a plurality of next vehicles, according to this embodiment, a next vehicle that needs to be focused on is determined from the plurality of next vehicles, and then a horizontal angle of the target rearview mirror of the current vehicle is adjusted such that the next vehicle is located in the view of the driver of the current vehicle, and the driver of the current vehicle may pay attention to a driving status of the next vehicle in real time, thereby ensuring driving safety of the current vehicle. In addition, a vehicle that does not need to be focused on is not in the view of the driver of the current vehicle, and therefore is prevented from interfering with judgment of the driver of the current vehicle.

The first auxiliary angle of the target next vehicle is an angle formed between a first straight line and a second straight line, the first straight line is a straight line passing through the target next vehicle and a first reference point, the second straight line is a straight line that passes through the first reference point and that is perpendicular to the target rearview mirror, and the first reference point is a point on the target rearview mirror.

Further, the first reference point is a center position point of the target rearview mirror.

Figure 5:
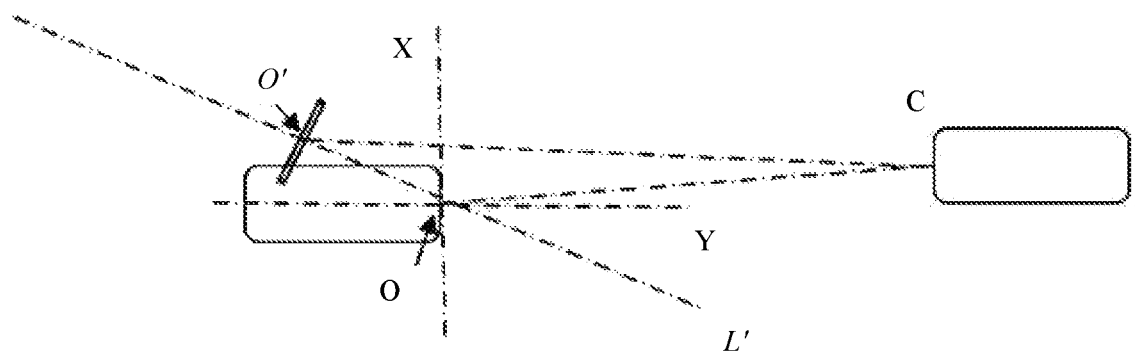
FIG. 5 is a schematic diagram of an auxiliary angle according to an embodiment of this application.

In a specific example, as shown in FIG. 5, the third auxiliary angle is ∠COY. A point O is a center position point of the rear of the current vehicle, and is also an installation position of the rearview camera. A straight line OY is a longitudinal center line of the current vehicle, OX is a vertical line passing through the point O, C is the center position of the front face of the next vehicle A, and a point O' is a center position of the right rearview mirror of the current vehicle, and a straight line OL' is a straight line that passes through O' and that is perpendicular to a mirror surface of the right rearview mirror of the current vehicle. The first reference point is the center position point of the target rearview mirror, the first auxiliary angle is ∠CO'L', the first straight line is a straight line CO', and the second straight line is the straight line O'L'. As shown in FIG. 5, the third auxiliary angle is ∠COY, which is an angle between a straight line passing through the center position of the front face of the next vehicle A and a straight line that passes through the position of the rearview camera and that is parallel to the longitudinal center line of the current vehicle.

In an embodiment, the obtaining a vehicle box of a next vehicle A based on the next-vehicle image includes performing median filtering on the next-vehicle image to obtain a filtered image; then performing edge detection on the filtered image based on a canny edge detection algorithm, to obtain an edge detection result; and finally obtaining the contour of the next vehicle A from the edge detection result based on a haar operator, where the vehicle box of the next vehicle A is the quantity of pixels in the contour of the next vehicle A.

It should be noted herein that if the next-vehicle image includes a plurality of next vehicles, a vehicle box of each of the plurality of next vehicles may be obtained at the same time based on the foregoing method.

In an example, an image (that is, a next-vehicle image) of an area behind the current vehicle is obtained using the rearview camera, median filtering is performed on the image to eliminate interference information in the next-vehicle image, then a canny edge is performed on the filtered image to segment the image to obtain an object, and finally, Haar operator detection is performed on an edge detection result, to find a vehicle body of a vehicle obtained through segmentation in an edge detection result, draw a minimum circumscribed rectangular box of each vehicle, and calculate a quantity of pixels occupied by the rectangular box of each vehicle. The quantity of pixels is a vehicle box. In this way, a vehicle box of each of the plurality of next vehicles is obtained.

In an embodiment, the obtaining a vehicle distance d based on the offset and the vehicle box of the next vehicle A includes searching a first relationship table based on the offset and the vehicle box of the next vehicle A, to obtain the vehicle distance d of the next vehicle A, where the vehicle distance d of the next vehicle A is a distance corresponding to the offset and the vehicle box of the next vehicle A, and the first relationship table is a table of a correspondence between an offset as well as a vehicle box and a distance.

It should be noted herein that after the vehicle box of the next vehicle A is obtained, a vehicle type, for example, a truck, a car, and a sport utility vehicle (SUV), of the next vehicle A may be determined based on the vehicle box of the next vehicle A. Because vehicle widths of different vehicle types are different, and widths of fronts of a same vehicle type differ little, an actual width of a front of the next vehicle A can be determined based on the vehicle type of the next vehicle A. For different offsets, the vehicle box includes a front and vehicle side faces of different proportions. A width of the front in the vehicle box is obtained based on the offset, and then the vehicle distance d between the next vehicle A and the current vehicle can be determined based on the actual width of the front of the next vehicle A and the width of the front of the next vehicle A in the next-vehicle image.

In an example, the first relationship table is obtained before the first relationship table is used. Table 1 is a table of a correspondence between an offset as well as a vehicle box and a distance, which is the foregoing first relationship table.

TABLE 1

| | Vehicle box Distance | | | | |
|---|---|---|---|---|---|
| Offset | 0.4 (megapixel) | 0.6 (megapixel) | 0.8 (megapixel) | 1.2 (megapixel) | ... |
| 5 cm | 40 | 30 | 20 | 13 | ... |
| 4 cm | 42 | 32 | 22 | 15 | ... |
| 3 cm | 44 | 34 | 24 | 17 | ... |
| 2 cm | 47 | 37 | 27 | 20 | ... |
| ... | ... | ... | ... | ... | ... |

In an example, the first relationship table is obtained before the first relationship table is used, which may be obtained from a third device, or may be created autonomously. The first relationship table is established using different vehicle boxes (CarBox) as well as offsets and corresponding vehicle distances d. The relationship table may also be represented as a function d=f(CarBox, offset) between an offset as well as a vehicle box and a distance. The first relationship table is used within a range of five lanes behind the current vehicle: two lanes on the left, two lanes on the right, and a current lane. The relationship table is related to a field of view, a resolution, and an installation position of a selected rearview camera. For example, the rearview camera is installed above a rear license plate, the resolution is 1280*960, and the view of the camera is 120° in a horizontal direction and 90° in a vertical direction.

It should be noted herein that Table 1 is merely an example used to indicate a relationship between an offset as well as a vehicle box and a distance, and change trends of variables do not limit the protection scope of this application.

In an embodiment, a second relationship table is searched based on the vehicle distance d and the offset of the next vehicle A, to obtain the third auxiliary angle of the next vehicle A, where the third auxiliary angle of the next vehicle A is a third auxiliary angle corresponding to the vehicle distance d and the offset of the next vehicle A, and the second relationship table is a table of a correspondence between a distance as well as an offset and a third auxiliary angle.

In an example, the second relationship table is obtained before the second relationship table is used. Table 2 is a table of a correspondence between a distance as well as an offset and a third auxiliary angle, which is the foregoing second relationship table.

TABLE 2

| Offset | Distance Third auxiliary angle | | | | |
|---|---|---|---|---|---|
| | 40 | 30 | 20 | 13 | ... |
| 5 | 15° | 17° | 20° | 23° | ... |
| 4 | 12° | 13° | 15° | 17° | ... |
| 3 | 5° | 6° | 8° | 10° | ... |
| 2 | 2° | 3° | 3° | 4° | ... |
| ... | ... | ... | ... | ... | ... |

In an example, the second relationship table is obtained before the second relationship table is used, which may be obtained from a third device, or may be created autonomously. The second relationship table is established using different offsets as well as vehicle distances d and corresponding third auxiliary angles. The relationship table may also be represented as a function ∠COY=f(d, offset) between d as well as an offset and a third auxiliary angle ∠COY This relationship table is used within a range of five lanes behind the current vehicle: two lanes on the left, two lanes on the right, and a current lane. This relationship table is related to a field of view, a resolution, and an installation position of a selected rearview camera. When this relationship table is established, first, a rearview camera is selected and an installation position of the rearview camera is fixed. Then, another vehicle for testing is placed at a different position, a vehicle distance d of the vehicle is recorded, a next-vehicle image is read, and a third auxiliary angle ∠COY and an offset are recorded, to obtain the second relationship table. A row is the distance d, in m, and a column is the offset, in cm. For example, the rearview camera is installed above a rear license plate, the resolution is 1280*960, and the view of the camera is 120° in a horizontal direction and 90° in a vertical direction.

In an embodiment, the obtaining an importance probability of the $i^{th}$ next vehicle based on a third auxiliary angle and a vehicle box of the $i^{th}$ next vehicle includes searching a fourth relationship table based on the third auxiliary angle and the vehicle box of the $i^{th}$ next vehicle, to obtain an importance probability corresponding to the third auxiliary angle and the vehicle box of the $i^{th}$ next vehicle, where the importance probability corresponding to the third auxiliary angle and the vehicle box of the $i^{th}$ next vehicle is the importance probability of the $i^{th}$ next vehicle, and the fourth relationship table is a table of a correspondence between a third auxiliary angle as well as a vehicle box and an importance probability.

It should be noted herein that when there is only one next vehicle in the next-vehicle image, an importance probability of the next vehicle is 1. When there are a plurality of lanes behind the current vehicle, only a next vehicle closest to the current vehicle is selected in each lane to determine an importance probability of the next vehicle.

In an example, the fourth relationship table is established before the fourth relationship table is used. Table 3 is a table of a correspondence between a third auxiliary angle as well as a vehicle box and an importance probability, which is the foregoing fourth relationship table.

TABLE 3

| Third auxiliary angle | Vehicle box Importance probability | | | | |
|---|---|---|---|---|---|
| | 0.4 (megapixel) | 0.6 (megapixel) | 0.8 (megapixel) | 1.2 (megapixel) | ... |
| 0° | 0.4 | 0.55 | 0.7 | 0.8 | ... |
| 10° | 0.35 | 0.5 | 0.6 | 0.7 | ... |
| 20° | 0.3 | 0.4 | 0.5 | 0.6 | ... |
| 30° | 0.22 | 0.32 | 0.4 | 0.5 | ... |
| ... | ... | ... | ... | ... | ... |

It should be noted herein that the fourth relationship table is used within a range of five lanes behind the current vehicle: two lanes on the left, two lanes on the right, and a current lane. This table search relationship is related to a field of view, a resolution, and an installation position of a selected rearview camera. For example, the rearview camera is installed above a rear license plate, the resolution is 1280*960, and the view of the camera is 120° in a horizontal direction and 90° in a vertical direction.

In an embodiment, the obtaining the first auxiliary angle of the target next vehicle based on a third auxiliary angle and a vehicle distance d of the target next vehicle includes searching a third relationship table based on the third auxiliary angle and the vehicle distance d, to obtain a first auxiliary angle corresponding to the third auxiliary angle and the vehicle distance d, where the first auxiliary angle corresponding to the third auxiliary angle and the vehicle distance d is the first auxiliary angle of the target next vehicle, and the third relationship table is a table of a correspondence between a third auxiliary angle as well as a vehicle distance d and a first auxiliary angle.

In another example, the third relationship table is obtained before the third relationship table is used, which may be obtained from a third device, or may be created autonomously. The third relationship table is established using different vehicle distances d as well as third auxiliary angles ∠COY and corresponding first auxiliary angles (∠CO'L'). The relationship table may also be expressed as a function ∠CO'L'=f(d, ∠COY) between a first auxiliary angle and a vehicle distance d as well as a third auxiliary angle. This relationship table is used within a range of five lanes behind the current vehicle: two lanes on the left, two lanes on the right, and a current lane.

Table 4 is a table of a correspondence between a third auxiliary angle as well as a vehicle distance d and a first auxiliary angle, which is the foregoing third relationship table.

TABLE 4

| Third auxiliary angle | Distance d First auxiliary angle | | | | |
|---|---|---|---|---|---|
| | 10 m | 20 m | 30 m | 40 m | ... |
| 0° | 15° | 17° | 20° | 23° | ... |
| 10° | 12° | 13° | 15° | 17° | ... |
| 20° | 5° | 6° | 8° | 10° | ... |
| 30° | 2° | 3° | 3° | 4° | ... |
| ... | ... | ... | ... | ... | ... |

The third relationship table is related to a field of view, a resolution, and an installation position of a selected rearview camera. When this relationship table is established, first, a rearview camera is selected and an installation position of the rearview camera is fixed. Then, another vehicle for testing is placed at a different position, a vehicle distance d of the vehicle is recorded, a next-vehicle image is read, and an angle ∠COY of the next vehicle in the image and an angle ∠CO'L' of the next vehicle in the rearview mirror are recorded, to obtain the third relationship table. A row is the vehicle distance d, in m, and a column is a value of ∠COY For example, the rearview camera is installed above a rear license plate, the resolution is 1280*960, and the view of the camera is 120° in a horizontal direction and 90° in a vertical direction.

It should be noted herein that because the first auxiliary angle is related to a position of the first reference point on the target rearview mirror, the first auxiliary angle, obtained based on the next-vehicle image, of the target next vehicle needs to be consistent with the first auxiliary angle in the third relationship table. In other words, both are angles obtained based on a same first reference point.

In another feasible embodiment, the obtaining the first auxiliary angle of the target next vehicle based on an offset and a vehicle box of the target next vehicle includes searching a sixth relationship table based on the third auxiliary angle and the vehicle box, to obtain a first auxiliary angle corresponding to the third auxiliary angle and the box, where the first auxiliary angle corresponding to the third auxiliary angle and the box is the first auxiliary angle of the target next vehicle, and the sixth relationship table is a table of a correspondence between an offset as well as a vehicle box and a first auxiliary angle.

It should be noted herein that for a manner of obtaining the fifth relationship table, refer to the foregoing manners of obtaining the first relationship table, the second relationship table, and the third relationship table. Details are not described herein again.

S203: Calculate a second auxiliary angle based on the view of the driver in the target rearview mirror, the spatial position of the human eye, and the position of the target rearview mirror.

The second auxiliary angle is an angle formed between a third straight line and a center line of a horizontal view, the third straight line is a straight line passing through the position of the human eye of the driver and a second reference point, the second reference point is an intersection between the center line of the horizontal view and a mirror surface of the target rearview mirror, and the center line of the horizontal view is an angle bisector of the horizontal field of view.

Figure 6:
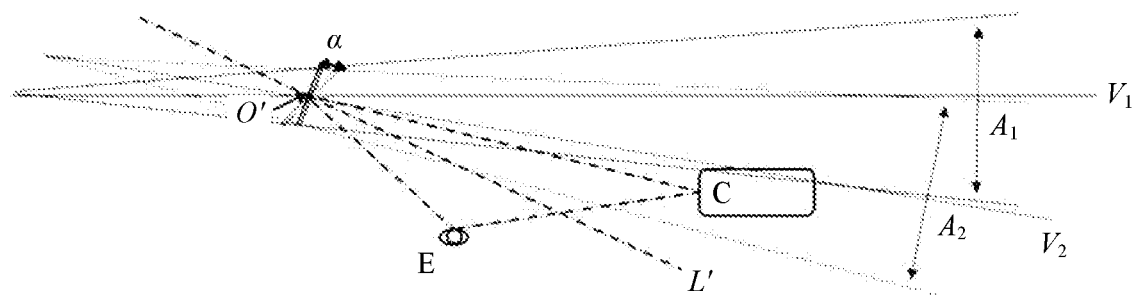
FIG. 6 is a schematic diagram of an auxiliary angle and a horizontal adjustment angle according to an embodiment of this application.

As shown in FIG. 6, E is a spatial position of a human eye of a driver. A point O' is a center position of a right rearview mirror. In other words, a second reference point is the center position of the right rearview mirror. A OL' is a line that passes through the center position of the right rearview mirror and that is perpendicular to a mirror surface. Based on a principle of mirror reflection, an angle between this perpendicular line and an incident ray passing through the mirror surface is the same as an angle between this perpendicular line and an emergent ray corresponding to the incident ray. C is a center of a front face of a next vehicle. A current horizontal view of the driver in the right rearview mirror is $A_1$. An adjusted horizontal view of the driver in the right rearview mirror is $A_2$. α is a horizontal adjustment angle of the rearview mirror. An angle ∠EO'$V_1$, namely, a second auxiliary angle, when the human eye looks towards a center of the horizontal view $A_1$ through a center point of the rearview mirror is calculated. A straight line O'$V_1$ is a center line of the horizontal view $A_1$, which is a center line of the horizontal view. A straight line O'$V_2$ is a center line of the horizontal view $A_2$, which is a center line of the horizontal view of the driver after a horizontal angle of the right rearview mirror is adjusted.

S204: Obtain a horizontal adjustment angle of the target rearview mirror based on the first auxiliary angle and the second auxiliary angle, and adjust a horizontal angle of the target rearview mirror based on the horizontal adjustment angle.

In a specific embodiment, the obtaining a horizontal adjustment angle of the target rearview mirror based on the first auxiliary angle and the second auxiliary angle includes searching a fifth relationship table based on the first auxiliary angle and the second auxiliary angle, to obtain a horizontal adjustment angle corresponding to the first auxiliary angle and the second auxiliary angle, where the horizontal adjustment angle corresponding to the first auxiliary angle and the second auxiliary angle is the horizontal adjustment angle of the target rearview mirror, and the fifth relationship table is a table of a correspondence between a first auxiliary angle as well as a second auxiliary angle and a horizontal adjustment angle.

In another example, the fifth relationship table is obtained before the fourth relationship table is used, which may be obtained from a third device, or may be created autonomously. The fourth relationship table is established using different first auxiliary angles ∠CO'L' as well as second auxiliary angles ∠EO'$V_1$ and corresponding horizontal adjustment angles α. The relationship table may also be considered as a function α=f(∠CO'L', ∠EO'$V_1$) between a first auxiliary angle ∠CO'L' as well as a second auxiliary angle ∠EO'$V_1$ and a horizontal adjustment angle α. This relationship table is used within a range of five lanes behind the current vehicle: two lanes on the left, two lanes on the right, and a current lane. This relationship table is related to a field of view, a resolution, and an installation position of a selected rearview camera. When this table is established, first, a rearview camera is selected and an installation position of the rearview camera is fixed. A model and an installation position of a rearview mirror are selected. Then, another vehicle for testing is placed at a different position, ∠CO'L' and ∠EO'$V_1$ are recorded, the rearview mirror is adjusted so that a next vehicle appears at a center of the rearview mirror, and a horizontal adjustment angle α in this case is recorded. In the following Table 5, for example, the rearview camera is installed above a rear license plate, the resolution is 1280*960, and the view of the camera is 120° in a horizontal direction and 90° in a vertical direction.

Table 5 is a table of a correspondence between a first auxiliary angle as well as a second auxiliary angle and a horizontal adjustment angle, which is the foregoing fifth relationship table.

TABLE 5

| Second auxiliary | First auxiliary angle Horizontal adjustment angle | | | | |
|---|---|---|---|---|---|
| angle | 20° | 25° | 30° | 35° | ... |
| 40° | 5° | 7° | 8° | 11° | ... |
| 45° | 6° | 9° | 11° | 11° | ... |
| 50° | 6° | 8° | 9° | 10° | ... |
| 55° | 6° | 8° | 8° | 11° | ... |
| ... | ... | ... | ... | ... | ... |

It should be noted herein that the target rearview mirror may be a left rearview mirror or a right rearview mirror. In other words, horizontal angles of both left and right mirrors of the current vehicle can be adjusted based on the foregoing method.

It should be noted herein that because the second auxiliary angle is related to a position of the second reference point on the target rearview mirror, the second auxiliary angle calculated based on the horizontal field of view, the spatial position of the human eye, and the position of the target rearview mirror needs to be consistent with the second auxiliary angle in the fifth relationship table. In other words, both are angles obtained based on a same first reference point.

It can be learned that in the solution in this embodiment of this application, according to this embodiment, the horizontal angle of the rearview mirror is adjusted based on the view of the driver and an outside-vehicle scene such that the driver can observe a noteworthy vehicle at any time through the rearview mirror. Compared with conventional rearview mirror adjustment, this embodiment uses an adaptive adjustment manner, which does not require manual adjustment, thereby avoiding impact on driving safety when the driver is distracted. In addition, in the adaptive adjustment manner in this embodiment, there is no blind spot for the driver during overtaking of the next vehicle, thereby ensuring driving safety. The solution in this implementation may employ cameras of different modes, such as a CMS camera and a DMS camera. In addition, this solution does not rely on a front-facing camera, which has an advantage of low hardware requirements.

The following describes an adjustment manner of the rearview mirror in the vertical direction.

Figure 7:
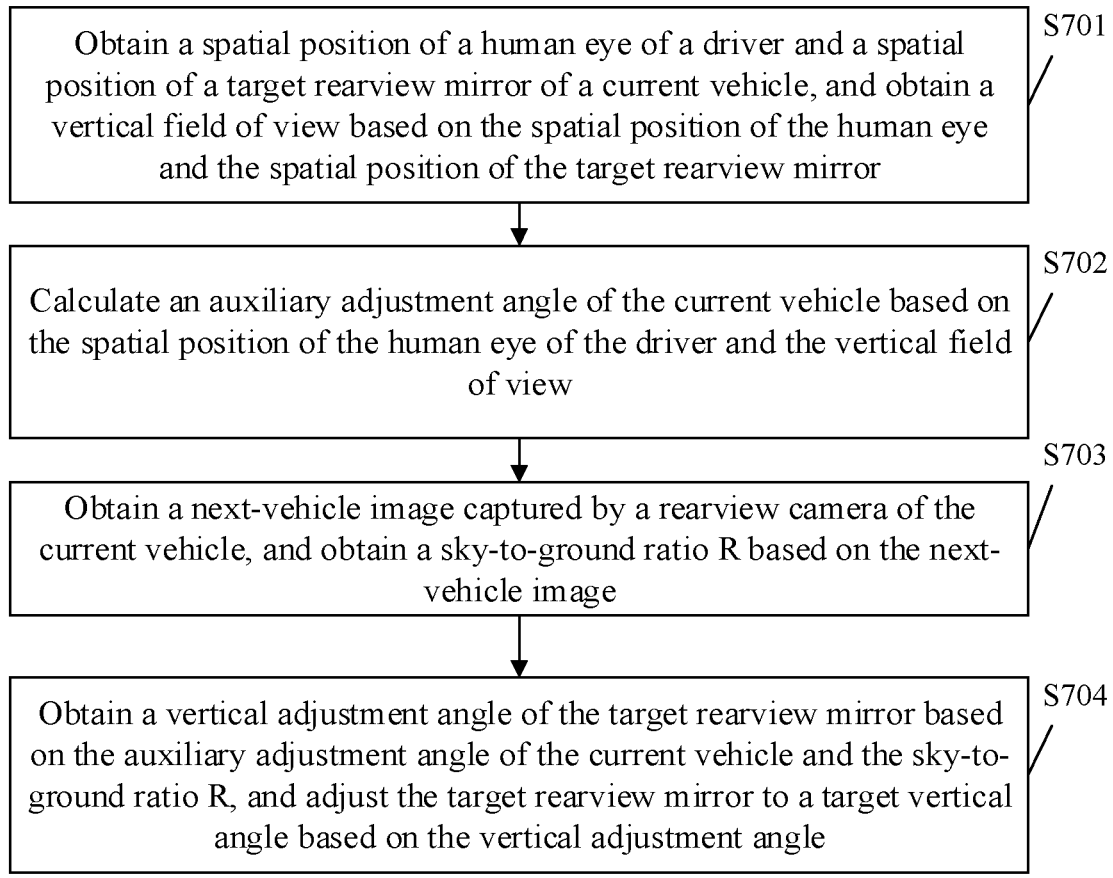
FIG. 7 is a schematic flowchart of another adaptive rearview mirror adjustment method according to an embodiment of this application.

FIG. 7 is a schematic flowchart of another adaptive rearview mirror adjustment method according to an embodiment of the present application. As shown in FIG. 7, the method includes the following steps.

S701. Obtain a spatial position of a human eye of a driver and a spatial position of a target rearview mirror of a current vehicle, and obtain a vertical field of view based on the spatial position of the human eye and the spatial position of the target rearview mirror.

It should be noted herein that the next-vehicle image may include vehicles driving in a plurality of lanes behind the vehicle.

Optionally, a rearview camera may be disposed at a center position of a rear of the current vehicle, or may be located at a position where a next-vehicle image can be obtained, for example, an upper left corner, an upper right corner, a lower left corner, a lower right corner, or another position of the current vehicle.

S702. Calculate an auxiliary adjustment angle of the current vehicle based on the spatial position of the human eye of the driver and the vertical field of view.

The auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is any position point on the target rearview mirror, and the center line of the vertical view is an angle bisector of the vertical field of view.

Further, the third reference point is a center position point of the target rearview mirror.

Figure 8:
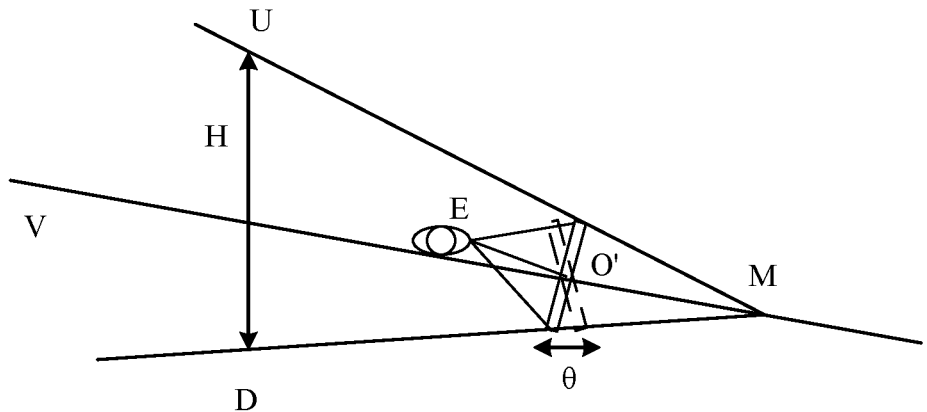
FIG. 8 is a schematic diagram of an auxiliary adjustment angle according to an embodiment of this application.

The auxiliary adjustment angle is described based on FIG. 8, and the third reference point is the center position point of the target rearview mirror. FIG. 8 is a schematic diagram of a view in a rearview mirror of the current vehicle in a vertical direction. As shown in FIG. 8, a point E is a spatial position of a human eye of a driver, and a point O' is a center position of a target rearview mirror, which is the third reference point. A point M is a symmetry point of the point E using the target rearview mirror as a symmetry axis. A current angle of the rearview mirror in the vertical direction is obtained from an electronic system, to calculate, based on a principle of mirror reflection, a vertical view H of the driver and an angle $\angle EO'V$, namely, an auxiliary adjustment angle, when the human eye looks towards a center of the view H through a center point O' of the rearview mirror. The third straight line is a straight line EO'. A straight line O'V is a center line of the vertical view. An angle corresponding to the vertical view H is a vertical field of view LUMD.

S703. Obtain a next-vehicle image captured by the rearview camera of the current vehicle, and obtain a sky-to-ground ratio R based on the next-vehicle image.

In an embodiment, the obtaining a sky-to-ground ratio R based on the next-vehicle image includes dividing the next-vehicle image longitudinally into a plurality of image strips; obtaining a target image strip from the plurality of image strips, where the target image strip is an image strip with continuous transition between sky and ground in the plurality of image strips; counting a quantity of pixels occupied by the sky and a quantity of pixels occupied by the ground in the target image strip; and calculating the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

Figure 9:
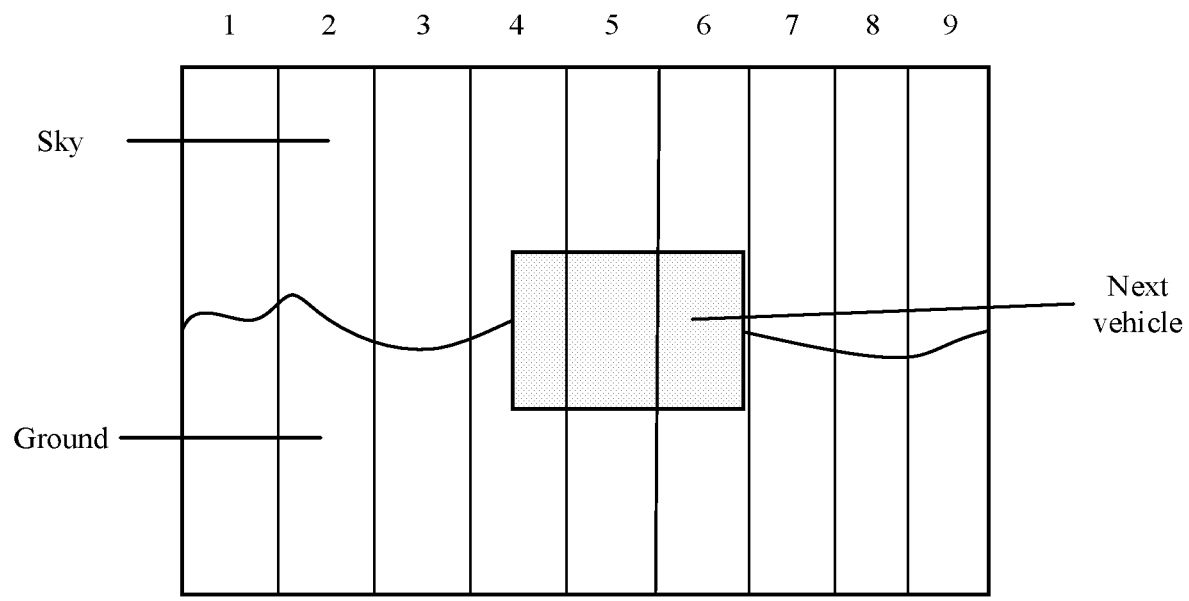
FIG. 9 is a schematic principle diagram of calculating a sky-to-ground ratio according to an embodiment of this application.

For example, in a next-vehicle image shown in FIG. 9, a curve in the figure is used as a boundary, an upper part of the image is sky, a lower part is ground, and a gray box in the middle is a next vehicle. As shown in FIG. 9, the next-vehicle image is longitudinally divided into nine image strips 1, 2, 3, 4, 5, 6, 7, 8, and 9. Because the next vehicle causes discontinuous transition between the sky and the ground in the image strips 4, 5, and 6, target image strips include only the image strips 1, 2, 3, 7, 8, and 9. Then, quantities of pixels occupied by the sky and the ground respectively in the image strips 1, 2, 3, 7, 8, and 9 are counted. Finally, a sky-to-ground ratio R is calculated based on the quantities of pixels occupied by the sky and the ground respectively.

S704. Obtain a vertical adjustment angle of the target rearview mirror based on the auxiliary adjustment angle of the current vehicle and the sky-to-ground ratio R, and adjust the target rearview mirror to a target vertical angle based on the vertical adjustment angle.

In an embodiment, the obtaining a vertical adjustment angle of the target rearview mirror based on the auxiliary adjustment angle and the sky-to-ground ratio R includes searching an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle of the target rearview mirror is the vertical adjustment angle corresponding to the auxiliary adjustment angle and the sky-to-ground ratio R, and the auxiliary relationship table is a table of a correspondence between an auxiliary adjustment angle as well as a sky-to-ground ratio R and a vertical adjustment angle.

It should be noted herein that because the auxiliary adjustment angle is related to a position of the third reference point on the target rearview mirror, the auxiliary adjustment angle of the current vehicle calculated based on the spatial position of the human eye of the driver and the vertical field of view needs to be consistent with the auxiliary adjustment angle in the auxiliary relationship table. In other words, both are angles obtained based on a same third reference point.

In an example, the auxiliary relationship table is obtained before the auxiliary relationship table is used, which may be obtained from a third device, or may be created autonomously. The auxiliary relationship table is established using different auxiliary adjustment angles ∠EO'V as well as sky-to-ground ratios R and corresponding vertical adjustment angles θ. The relationship table may also be considered as a function θ=f(R, ∠EO'V₁) between an auxiliary adjustment angle ∠EO'V as well as a sky-to-ground ratio R and a vertical adjustment angle θ. This fifth relationship table is related to a field of view, a resolution, and an installation position of a selected rearview camera. When this relationship table is established, first, a rearview camera is selected and an installation position of the rearview camera is fixed. A model and an installation position of a rearview mirror are determined. In the following Table 6, for example, the rearview camera is installed above a rear license plate, the resolution is 1280*960, and the view of the camera is 120° in a horizontal direction and 90° in a vertical direction.

Table 6 is a table of a correspondence between an auxiliary adjustment angle as well as a sky-to-ground ratio R and a vertical adjustment angle, which is the foregoing auxiliary relationship table.

TABLE 6

| Auxiliary adjustment angle | R Vertical adjustment angle | | | | |
|---|---|---|---|---|---|
| | 5 | 4 | 3 | 2 | ... |
| 40° | 5° | 7° | 8° | 11° | ... |
| 45° | 6° | 9° | 11° | 11° | ... |
| 50° | 6° | 8° | 9° | 10° | ... |
| 55° | 6° | 8° | 8° | 11° | ... |
| ... | ... | ... | ... | ... | ... |

After the vertical adjustment angle is obtained, a vertical angle of the target rearview mirror to the target vertical angle is adjusted based on the vertical adjustment angle.

It can be learned that in the solution in this embodiment of this application, according to this embodiment, the vertical angle of the rearview mirror is adjusted based on a view of the driver and an outside-vehicle scene or based on a gradient of a current driving road such that the driver can observe a status behind the current vehicle at any time through the rearview mirror. Compared with conventional rearview mirror adjustment, this embodiment uses an adaptive adjustment manner, which does not require manual adjustment, thereby avoiding impact on driving safety when the driver is distracted by manual adjustment of the rearview mirror. The solution in this implementation may employ cameras of different modes, such as a CMS camera and a DMS camera. In addition, this solution does not rely on a front-facing camera, which has an advantage of low hardware requirements.

Figure 10:
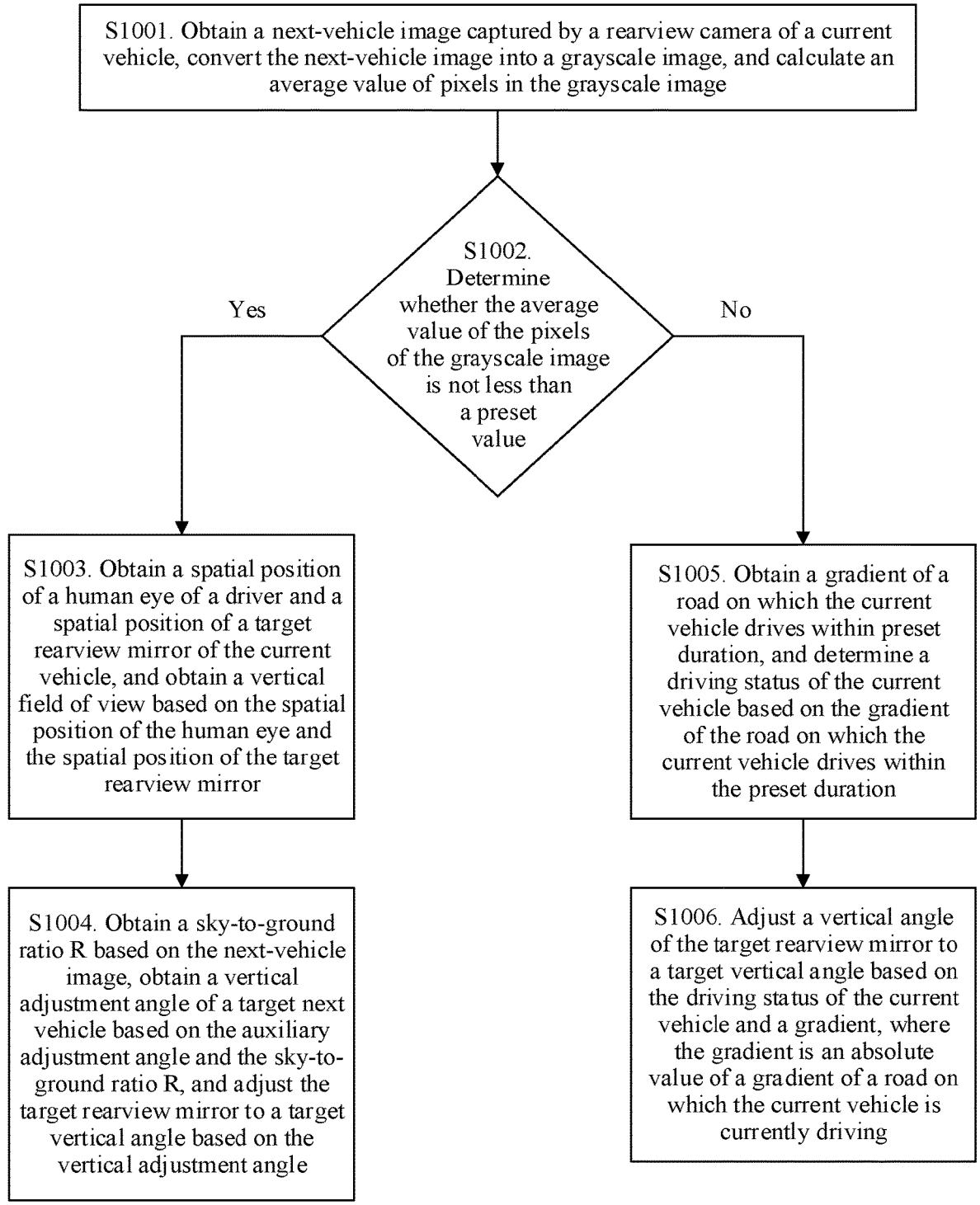
FIG. 10 is a schematic flowchart of another adaptive rearview mirror adjustment method according to an embodiment of this application.

FIG. 10 is a schematic flowchart of another adaptive rearview mirror adjustment method according to an embodiment of the present application. As shown in FIG. 10, the method includes the following steps.

S1001. Obtain a next-vehicle image captured by a rearview camera of a current vehicle, convert the next-vehicle image into a grayscale image, and calculate an average value of pixels in the grayscale image.

It should be noted herein that the next-vehicle image may include vehicles driving in a plurality of lanes behind the vehicle.

Optionally, the rearview camera may be disposed at a center position of a rear of the current vehicle, or may be located at a position where a next-vehicle image can be obtained, for example, an upper left corner, an upper right corner, a lower left corner, a lower right corner, or another position of the current vehicle.

It should be noted herein that for a dark night or an extreme weather condition (for example, weather with low visibility such as heavy fog, heavy rain, or heavy snow), a sky-to-ground ratio R cannot be obtained based on a next-vehicle image. Therefore, when the next-vehicle image is used, it needs to detect the next-vehicle image to determine whether a sky-to-ground ratio R can be obtained. If the sky-to-ground ratio R cannot be obtained using the next-vehicle image, the target rearview mirror is adjusted based on a gradient at which the current vehicle is currently driving. In an example, whether a sky-to-ground ratio R can be obtained is determined by converting the next-vehicle image into a grayscale image, calculating an average value of pixels in the grayscale image, and then determining whether the average value is not less than a preset value.

S1002. Determine whether the average value of the pixels of the grayscale image is not less than a preset value.

If the average value of the pixels of the grayscale image is not less than the preset value, steps S1003 and S1004 are performed. If the average value of the pixels of the grayscale image is less than the preset value, step 1005 and step S1006 are performed.

It should be noted herein that if the average value of the pixels of the grayscale image corresponding to the next-vehicle image is less than the preset value, it indicates that the next-vehicle image is excessively dark. For example, the next-vehicle image is an image obtained at a dark night or on a heavy foggy day. In this case, the sky-to-ground ratio R cannot be calculated.

S1003. Obtain a spatial position of a human eye of a driver and a spatial position of a target rearview mirror of the current vehicle, and obtain a vertical field of view based on the spatial position of the human eye and the spatial position of the target rearview mirror.

The auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, and the third reference point is a point on the target rearview mirror.

Optionally, the third reference point is a center position point of the target rearview mirror.

It should be noted herein that for a specific process of obtaining the spatial position of the human eye of the driver of the current vehicle and the position of the target rearview mirror of the current vehicle, refer to related descriptions of step S201. Details are not described herein again.

S1004. Obtain a sky-to-ground ratio R based on the next-vehicle image, obtain a vertical adjustment angle of the target rearview mirror based on the auxiliary adjustment angle and the sky-to-ground ratio R, and adjust the target rearview mirror to a target vertical angle based on the vertical adjustment angle.

In an embodiment, the obtaining a sky-to-ground ratio R based on the next-vehicle image includes dividing the next-vehicle image longitudinally into a plurality of image strips; obtaining a target image strip from the plurality of image strips, where the target image strip is an image strip with continuous transition between sky and ground in the plurality of image strips; counting a quantity of pixels occupied by the sky and a quantity of pixels occupied by the ground in the target image strip; and calculating the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, the obtaining a vertical adjustment angle of the target rearview mirror based on the auxiliary adjustment angle and the sky-to-ground ratio R includes searching an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle of the target rearview mirror is the vertical adjustment angle corresponding to the auxiliary adjustment angle and the sky-to-ground ratio R, and the fifth relationship table is a table of a correspondence between an auxiliary adjustment angle as well as a sky-to-ground ratio R and a vertical adjustment angle.

It should be noted herein that for specific descriptions of steps S1001 to S1004, refer to related descriptions of steps S701 to S704. Details are not described herein again.

S1005. Obtain a gradient of a road on which the current vehicle drives within preset duration, and determine a driving status of the current vehicle based on the gradient of the road on which the current vehicle drives within the preset duration.

When the sky-to-ground ratio cannot be calculated, a gradient of a road on which the current vehicle drives may be obtained using a gyroscope of the current vehicle, to obtain a driving status of the current vehicle.

In an example, the gradient of the road on which the current vehicle drives within the preset duration is obtained, to determine the driving status of the current vehicle based on the gradient of the road on which the current vehicle drives within the preset duration. The driving status of the current vehicle includes a flat ground driving state, a long downhill state, a reaching-downhill state, a leaving-downhill state, a long uphill state, a reaching-uphill state, and a leaving-uphill state.

Figure 11:
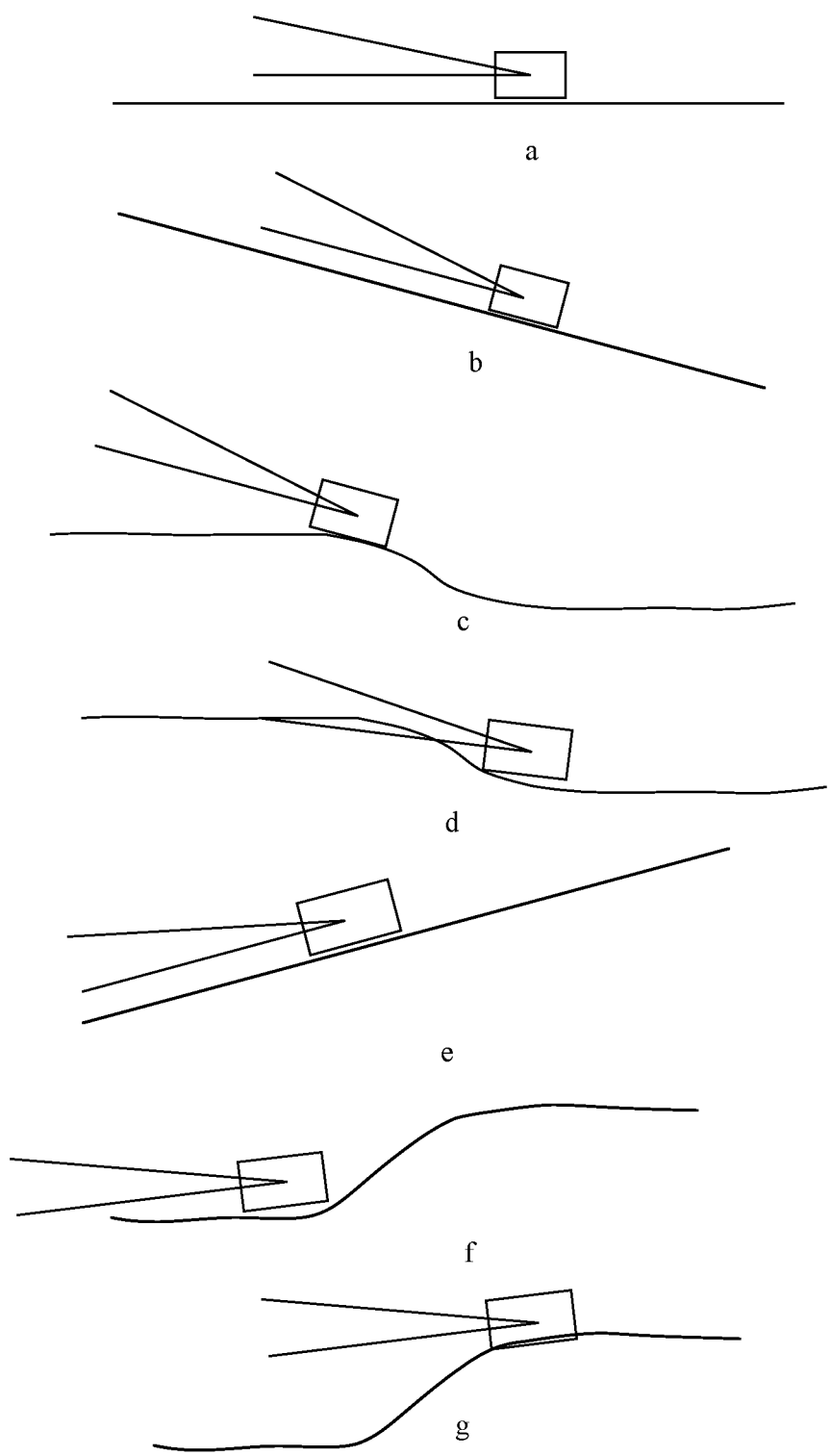
FIG. 11 is a schematic principle diagram of adjusting a vertical angle of a rearview mirror based on a gradient according to an embodiment of this application.

As shown in FIG. 11, a box in the figure represents the current vehicle. When an absolute value of a gradient of a driving road detected within the preset duration approaches 0, the driving status of the current vehicle is the flat ground driving state, as shown in FIG. 11a.

When a gradient of a driving road detected within the preset duration is less than 0 and the gradient remains unchanged, the driving status of the current vehicle is the long downhill state, as shown in FIG. 11b.

When a gradient of a driving road detected within the preset duration is less than 0 and an absolute value of the gradient gradually increases, the driving status of the current vehicle is the reaching-downhill state, as shown in FIG. 11c.

When a gradient of a driving road detected within the preset duration is less than 0 and an absolute value of the gradient gradually decreases and even approaches 0, the driving status of the current vehicle is the leaving-downhill state, as shown in FIG. 11d.

When a gradient of a driving road detected within the preset duration is greater than 0 and the gradient remains unchanged, the driving status of the current vehicle is the long uphill state, as shown in FIG. 11e.

When a gradient of a driving road detected within the preset duration is greater than 0 and an absolute value of the gradient gradually increases and then remains unchanged, the driving status of the current vehicle is the reaching-uphill state, as shown in FIG. 11f.

When a gradient of a driving road detected within the preset duration is less than 0 and an absolute value of the gradient gradually decreases and approaches 0, the driving status of the current vehicle is the leaving-uphill state, as shown in FIG. 11g.

It should be noted herein that because a vehicle may bump in a driving process due to a pitted road surface of a road, the "gradient remains unchanged" means that the gradient changes within an interval [a−b, a+b], where a indicates an absolute value of a gradient of a road on which the vehicle is currently driving, and b is a change amplitude, and is a relatively small value, for example, 0.01, 0.02, 0.05, 0.1, 0.5, 0.6, 0.8, 1 or another relatively small value.

S1006. Adjust a vertical angle of the target rearview mirror to a target vertical angle based on the driving status of the current vehicle and a gradient $\beta$, where the gradient $\beta$ is an absolute value of a gradient of a road on which the current vehicle is currently driving.

In an example, in different driving states, to ensure that a status of an area behind can be observed in real time through the rearview mirror, the vertical angle of the target rearview mirror needs to be adjusted to the target vertical angle based on the driving status of the current vehicle.

When the driving status of the current vehicle is the flat ground driving state, the target vertical angle is a preset angle $\theta$. When the driving status of the current vehicle is the long downhill driving state, the target vertical angle is the preset angle $\theta$. When the driving status of the current vehicle is the reaching-downhill driving state, the target vertical angle is $\theta-\beta/2$. When the driving status of the current vehicle is the leaving-downhill driving state, the target vertical angle is $\theta+\beta/2$. When the driving status of the current vehicle is the long uphill driving state, the target vertical angle is the preset angle $\theta$. When the driving status of the current vehicle is the reaching-uphill driving state, the target vertical angle is $\theta-\beta/2$. When the driving status of the current vehicle is the leaving-uphill driving state, the target vertical angle is $\theta+\beta/2$.

In an embodiment, after the vertical angle of the target rearview mirror is adjusted using the method in the embodiment shown in FIG. 7, if an adjusted vertical angle of the target rearview mirror meets a user requirement, and if the user requirement is not met, an action of adjusting the vertical angle of the target rearview mirror based on the driving status of the current vehicle may be performed according to a user instruction such that the user requirement can be better met.

In another feasible embodiment, first, vertical adjustment angles of the target rearview mirror are determined respectively using the method in the embodiment shown in FIG. 7 and based on the driving status of the current vehicle. Then the obtained vertical adjustment angles are processed, for example, averaged or weighted summed, to obtain a processed vertical adjustment angle. Finally, the vertical angle of the target rearview mirror is adjusted to a target vertical angle based on the processed vertical adjustment angle. In this manner, an inaccurate vertical adjustment angle obtained using one of the foregoing two methods can be effectively avoided.

It can be learned that in the solution in this embodiment of this application, according to this embodiment, the vertical angle of the rearview mirror is adjusted based on a view of the driver and an outside-vehicle scene or based on a gradient of a current driving road such that the driver can observe a status behind the current vehicle at any time through the rearview mirror. Compared with conventional rearview mirror adjustment, this embodiment uses an adaptive adjustment manner, which does not require manual adjustment, thereby avoiding impact on driving safety when the driver is distracted by manual adjustment of the rearview mirror. The solution in this implementation may employ cameras of different modes, such as a CMS camera and a DMS camera. In addition, this solution does not rely on a front-facing camera, which has an advantage of low hardware requirements.

Figure 12:
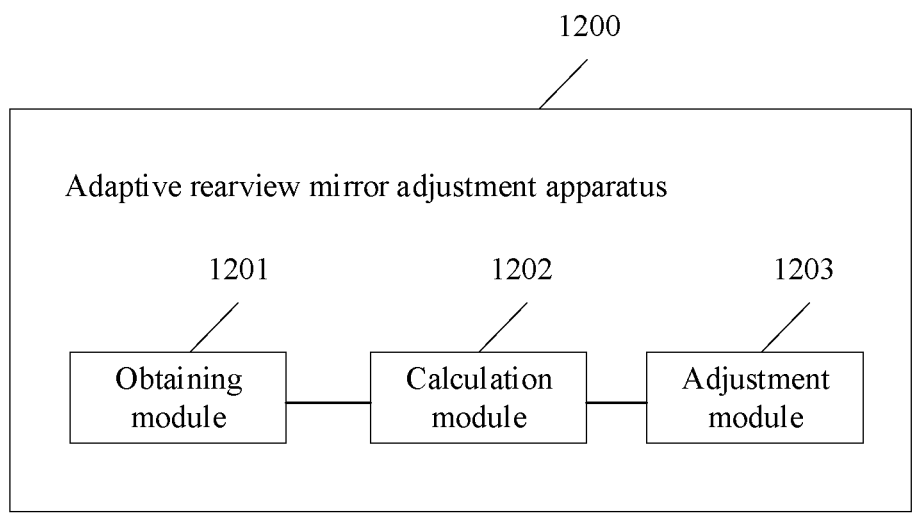
FIG. 12 is a schematic structural diagram of an adaptive rearview mirror adjustment apparatus according to an embodiment of this application.

FIG. 12 is a schematic structural diagram of an adaptive rearview mirror adjustment apparatus according to an embodiment of this application. As shown in FIG. 12, the adaptive rearview mirror adjustment apparatus 1200 includes an obtaining module 1201, a calculation module 1202, and an adjustment module 1203.

The obtaining module 1201 is configured to obtain a spatial position of a human eye of a driver of a current vehicle and a spatial position of a target rearview mirror, and obtain a horizontal field of view of the driver in the target rearview mirror based on the spatial position of the human eye and the spatial position of the target rearview mirror; and obtain a next-vehicle image, and obtain a first auxiliary angle of a target next vehicle based on the next-vehicle image, where the first auxiliary angle is an angle formed between a first straight line and a second straight line, the first straight line is a straight line passing through the target next vehicle and a first reference point, the second straight line is a straight line that passes through the first reference point and that is perpendicular to the target rearview mirror, the first reference point is a point on the target rearview mirror, the next-vehicle image is obtained by a rearview camera, and the next-vehicle image includes the target next vehicle.

The calculation module 1202 is configured to calculate a second auxiliary angle based on the horizontal field of view, the spatial position of the human eye, and the position of the target rearview mirror, where the second auxiliary angle is an angle formed between a third straight line and a center line of a horizontal view, the third straight line is a straight line passing through the position of the human eye of the driver and a second reference point, the second reference point is an intersection between the center line of the horizontal view and a mirror surface of the target rearview mirror, and the center line of the horizontal view is an angle bisector of the horizontal field of view.

The obtaining module 1201 is further configured to obtain a horizontal adjustment angle of the target rearview mirror based on the first auxiliary angle and the second auxiliary angle.

The adjustment module 1203 is configured to adjust a horizontal angle of the target rearview mirror based on the horizontal adjustment angle.

In an embodiment, the next-vehicle image includes M vehicles, M is an integer greater than or equal to 1, and in an aspect of obtaining the first auxiliary angle of the target next vehicle based on the next-vehicle image, the obtaining module 1201 is configured to obtain a vehicle box and an offset of a next vehicle A based on the next-vehicle image, where the offset is a distance between a center position of a front face of the next vehicle A in the next-vehicle image and a longitudinal center line of the next-vehicle image, and the vehicle box is a quantity of pixels occupied by a contour of the next vehicle A in the next-vehicle image; obtain a vehicle distance d based on the offset and the vehicle box of the next vehicle A, where the vehicle distance d is a distance between the front face of the next vehicle A and a rear of the current vehicle; and obtain a third auxiliary angle of the next vehicle A based on the vehicle distance d and the offset of the next vehicle A, where the third auxiliary angle is an angle formed between a fourth straight line and a transverse center line of the current vehicle, and the fourth straight line is a straight line passing through a position of the rearview camera and the center position of the front face of the next vehicle A; and when M=1, and the next vehicle A is the target next vehicle, obtain the first auxiliary angle of the target next vehicle based on a third auxiliary angle and a vehicle distance d of the target next vehicle; or when M is greater than 1, and the next vehicle A is an $i^{th}$ vehicle of the M next vehicles, where i=1, 2, . . . , or M, obtain an importance probability of the $i^{th}$ next vehicle based on a third auxiliary angle and a vehicle distance d of the $i^{th}$ next vehicle, determine a next vehicle with the highest importance probability as the target vehicle, and obtain the first auxiliary angle of the target next vehicle based on a third auxiliary angle and a vehicle box of the target next vehicle.

In an embodiment, in an aspect of obtaining the vehicle distance d based on the offset and the vehicle box of the next vehicle A, the obtaining module 1201 is configured to search a first relationship table based on the offset and the vehicle box of the next vehicle A, to obtain the vehicle distance d of the next vehicle A, where the vehicle distance d of the next vehicle A is a distance corresponding to the offset and the vehicle box of the next vehicle A, and the first relationship table is a table of a correspondence between an offset as well as a vehicle box and a distance; and in an aspect of obtaining the third auxiliary angle of the next vehicle A based on the vehicle distance d and the offset of the next vehicle A, the obtaining module 1201 is configured to search a second relationship table based on the vehicle distance d and the offset of the next vehicle A, to obtain the third auxiliary angle of the next vehicle A, where the third auxiliary angle of the next vehicle A is a third auxiliary angle corresponding to the vehicle distance d and the offset of the next vehicle A, and the second relationship table is a table of a correspondence between a distance as well as an offset and a third auxiliary angle.

In an embodiment, in an aspect of obtaining the first auxiliary angle of the target next vehicle based on the third auxiliary angle and the vehicle distance d of the target next vehicle, the obtaining module 1201 is configured to search a third relationship table based on the third auxiliary angle and the vehicle distance d of the target next vehicle, to obtain a first auxiliary angle corresponding to the third auxiliary angle and the vehicle distance d of the target next vehicle, where the first auxiliary angle corresponding to the third auxiliary angle and the vehicle distance d of the target next vehicle is the first auxiliary angle of the target next vehicle, and the third relationship table is a table of a correspondence between a third auxiliary angle as well as a vehicle distance d and a first auxiliary angle.

In an embodiment, in an aspect of obtaining the vehicle box of the next vehicle A based on the next-vehicle image, the obtaining module 1201 is configured to perform median filtering on the next-vehicle image to obtain a filtered image;

perform edge detection on the filtered image based on a canny edge detection algorithm, to obtain an edge detection result; and obtain the contour of the next vehicle A from the edge detection result based on a haar operator, and calculate the quantity of pixels in the contour of the next vehicle A.

In an embodiment, in an aspect of obtaining the importance probability of the $i^{th}$ next vehicle based on the third auxiliary angle and the vehicle box of the $i^{th}$ next vehicle, the obtaining module 1201 is configured to search a fourth relationship table based on the third auxiliary angle and the vehicle box of the $i^{th}$ next vehicle, to obtain an importance probability corresponding to the third auxiliary angle and the vehicle box of the $i^{th}$ next vehicle, where the importance probability corresponding to the third auxiliary angle and the vehicle box of the $i^{th}$ next vehicle is the importance probability of the $i^{th}$ next vehicle, and the fourth relationship table is a table of a correspondence between a third auxiliary angle as well as a vehicle box and an importance probability.

In an embodiment, in an aspect of obtaining the horizontal adjustment angle of the target rearview mirror based on the first auxiliary angle and the second auxiliary angle, the obtaining module 1201 is configured to search a fifth relationship table based on the first auxiliary angle and the second auxiliary angle, to obtain a horizontal adjustment angle corresponding to the first auxiliary angle and the second auxiliary angle, where the horizontal adjustment angle corresponding to the first auxiliary angle and the second auxiliary angle is the horizontal adjustment angle of the target rearview mirror, and the fifth relationship table is a table of a correspondence between a first auxiliary angle as well as a second auxiliary angle and a horizontal adjustment angle.

It should be noted that the foregoing modules (the obtaining module 1201, the calculation module 1202, and the adjustment module 1203) are configured to perform related steps of the foregoing method. For example, the obtaining module 1201 is configured to perform related content of S201 and S202, the calculation module 1202 is configured to perform related content of S203, and the adjustment module 1203 is configured to perform related content of S204.

In this embodiment, the adaptive rearview mirror adjustment apparatus 1200 is presented in the form of modules. The "module" herein may be an ASIC circuit, a processor for executing one or more software or firmware programs, a memory, an integrated logical circuit, and/or another component that can provide the foregoing function. In addition, the obtaining module 1201, the calculation module 1202, and the adjustment module 1203 may be implemented using a processor 1501 of an adaptive rearview mirror adjustment apparatus shown in FIG. 15.

Figure 13:
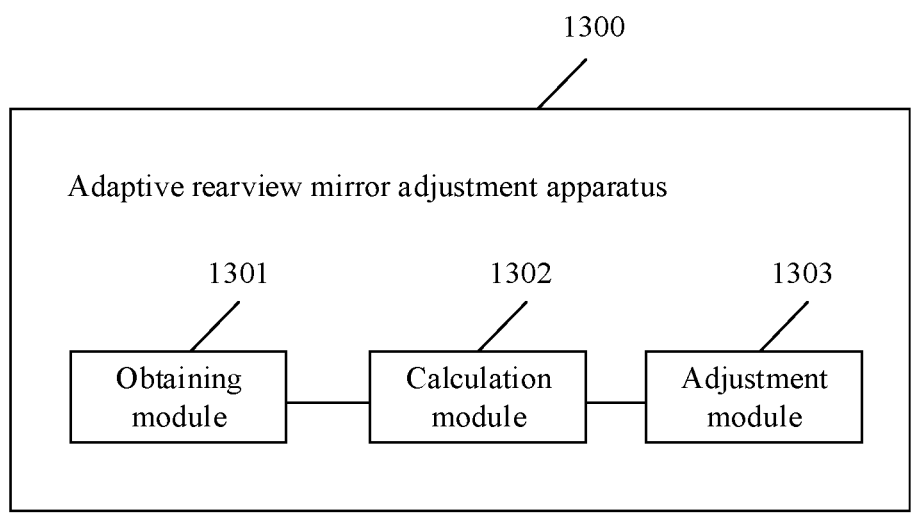
FIG. 13 is a schematic structural diagram of another adaptive rearview mirror adjustment apparatus according to an embodiment of this application.

FIG. 13 is a schematic structural diagram of another adaptive rearview mirror adjustment apparatus according to an embodiment of this application. As shown in FIG. 13, the adaptive rearview mirror adjustment apparatus 1300 includes an obtaining module 1301, a calculation module 1302, and an adjustment module 1303.

The obtaining module 1301 is configured to obtain a spatial position of a human eye of a driver and a spatial position of a target rearview mirror of a current vehicle, and obtain a vertical field of view based on the spatial position of the human eye and the spatial position of the target rearview mirror.

The calculation module 1302 is configured to calculate an auxiliary adjustment angle of the current vehicle based on the spatial position of the human eye of the driver and the vertical field of view, where the auxiliary adjustment angle of the current vehicle is an angle formed between a center line of a vertical view and a fifth straight line, the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

The obtaining module 1301 is further configured to obtain a next-vehicle image captured by a rearview camera of the current vehicle, and obtain a sky-to-ground ratio R based on the next-vehicle image; and obtain a vertical adjustment angle of the target rearview mirror based on the auxiliary adjustment angle of the current vehicle and the sky-to-ground ratio R.

The adjustment module 1303 is configured to adjust the target rearview mirror to a target vertical angle based on the vertical adjustment angle.

In an embodiment, in an aspect of obtaining the sky-to-ground ratio R based on the next-vehicle image, the obtaining module 1301 is configured to divide the next-vehicle image longitudinally into a plurality of image strips; obtain a target image strip from the plurality of image strips, where the target image strip is an image strip with continuous transition between sky and ground in the plurality of image strips; count a quantity of pixels occupied by the sky and a quantity of pixels occupied by the ground in the target image strip; and calculate the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, in an aspect of obtaining the vertical adjustment angle of the target rearview mirror based on the auxiliary adjustment angle of the current vehicle and the sky-to-ground ratio R, the obtaining module 1301 is configured to search an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio and a vertical adjustment angle.

It should be noted that the foregoing modules (the obtaining module 1301, the calculation module 1302, and the adjustment module 1303) are configured to perform related steps of the foregoing method. For example, the obtaining module 1301 is configured to perform related content of S701 and S703, the calculation module 1302 is configured to perform related content of S702, and the adjustment module 1303 is configured to perform related content of S704.

In this embodiment, the adaptive rearview mirror adjustment apparatus 1300 is presented in the form of modules. The "module" herein may be an ASIC circuit, a processor for executing one or more software or firmware programs, a memory, an integrated logical circuit, and/or another component that can provide the foregoing function. In addition, the obtaining module 1301, the calculation module 1302, and the adjustment module 1303 may be implemented using a processor 1601 of an adaptive rearview mirror adjustment apparatus shown in FIG. 16.

Figure 14:
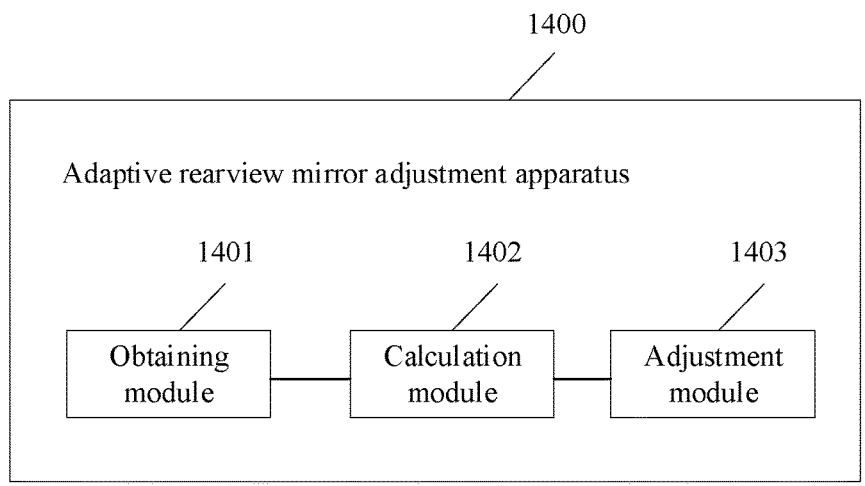
FIG. 14 is a schematic structural diagram of another adaptive rearview mirror adjustment apparatus according to an embodiment of this application.

FIG. 14 is a schematic structural diagram of an adaptive rearview mirror adjustment apparatus according to an embodiment of this application. As shown in FIG. 14, the adaptive rearview mirror adjustment apparatus 1400 includes an obtaining module 1401, a calculation module 1402, and an adjustment module 1403.

The obtaining module 1401 is configured to obtain a next-vehicle image captured by a rearview camera of a current vehicle.

The calculation module 1402 is configured to convert the next-vehicle image into a grayscale image, and calculate an average value of pixels in the grayscale image.

The obtaining module 1401 is further configured to, if the average value is not less than a preset value, obtain a spatial position of a human eye of a driver of the current vehicle and a spatial position of a target rearview mirror of the current vehicle, and obtain a vertical field of view based on the spatial position of the human eye and the spatial position of the target rearview mirror.

The calculation module 1402 is further configured to calculate an auxiliary adjustment angle of the current vehicle based on the spatial position of the human eye of the driver and the vertical field of view, where the auxiliary adjustment angle of the current vehicle is an angle formed between a center line of a vertical view and a fifth straight line.

The obtaining module 1401 is further configured to obtain a sky-to-ground ratio R based on the next-vehicle image; and obtain a vertical adjustment angle of the target rearview mirror based on the auxiliary adjustment angle of the current vehicle and the sky-to-ground ratio R.

The adjustment module 1403 is configured to adjust the target rearview mirror to a target vertical angle based on the vertical adjustment angle.

In an embodiment, in an aspect of obtaining the sky-to-ground ratio R based on the next-vehicle image, the obtaining module 1601 is configured to divide the next-vehicle image longitudinally into a plurality of image strips; obtain a target image strip from the plurality of image strips, where the target image strip is an image strip with continuous transition between sky and ground in the plurality of image strips; count a quantity of pixels occupied by the sky and a quantity of pixels occupied by the ground in the target image strip; and calculate the sky-to-ground ratio R based on the quantity of pixels occupied by the sky and the quantity of pixels occupied by the ground, where the sky-to-ground ratio R is a ratio of the quantity of pixels occupied by the sky to the quantity of pixels occupied by the ground.

In an embodiment, in an aspect of obtaining the vertical adjustment angle of the target rearview mirror based on the auxiliary adjustment angle of the current vehicle and the sky-to-ground ratio R, the obtaining module 1401 is configured to search an auxiliary relationship table based on the auxiliary adjustment angle and the sky-to-ground ratio R, to obtain a vertical adjustment angle corresponding to the auxiliary adjustment angle and the sky-to-ground ratio R, where the vertical adjustment angle corresponding to the auxiliary adjustment angle and the sky-to-ground ratio R is the vertical adjustment angle of the target rearview mirror, and the auxiliary relationship table is a table of a correspondence between an auxiliary adjustment angle as well as a sky-to-ground ratio R and a vertical adjustment angle.

In an embodiment, if the average value is less than the preset value, the obtaining module 1401 is further configured to obtain a gradient of a road on which the current vehicle drives within preset duration; and determine a driving status of the current vehicle based on the gradient of the road on which the current vehicle drives within the preset duration; and the adjustment module is further configured to adjust a vertical angle of the target rearview mirror to a target vertical angle based on the driving status of the current vehicle and a gradient $\beta$, where the gradient $\beta$ is an absolute value of a gradient of a road on which the current vehicle is currently driving.

In a possible design, the adjustment module 1403 is configured to, when the driving status of the current vehicle is a flat ground driving state, adjust the target vertical angle to a preset angle $\theta$; when the driving status of the current vehicle is a long downhill driving state, adjust the target vertical angle to the preset angle $\theta$; when the driving status of the current vehicle is a reaching-downhill driving state, adjusting the target vertical angle to $\theta-\beta/2$; when the driving status of the current vehicle is a leaving-downhill driving state, adjusting the target vertical angle to $\theta+\beta/2$; when the driving status of the current vehicle is a long uphill driving state, adjust the target vertical angle to the preset angle $\theta$; when the driving status of the current vehicle is a reaching-uphill driving state, adjust the target vertical angle to $\theta-\beta/2$; and when the driving status of the current vehicle is a leaving-uphill driving state, adjusting the target vertical angle to $\theta+\beta/2$.

It should be noted that the foregoing modules (the obtaining module 1401, the calculation module 1402, and the adjustment module 1403) are configured to perform related steps of the foregoing method. For example, the obtaining module 1401 is configured to perform related content of S1001 to S1005, the calculation module 1302 is configured to perform related content of S1001, and the adjustment module 1403 is configured to perform related content of S1006.

In this embodiment, the adaptive rearview mirror adjustment apparatus 1400 is presented in the form of modules. The "module" herein may be an ASIC circuit, a processor for executing one or more software or firmware programs, a memory, an integrated logical circuit, and/or another component that can provide the foregoing function. In addition, the obtaining module 1401, the calculation module 1402, and the adjustment module 1403 may be implemented using a processor 1601 of an adaptive rearview mirror adjustment apparatus shown in FIG. 16.

It should be noted herein that the apparatus shown in FIG. 12 and FIG. 13 or FIG. 14 may be a same apparatus or different apparatuses. FIG. 13 and FIG. 14 may show a same apparatus or different apparatuses.

Figure 15:
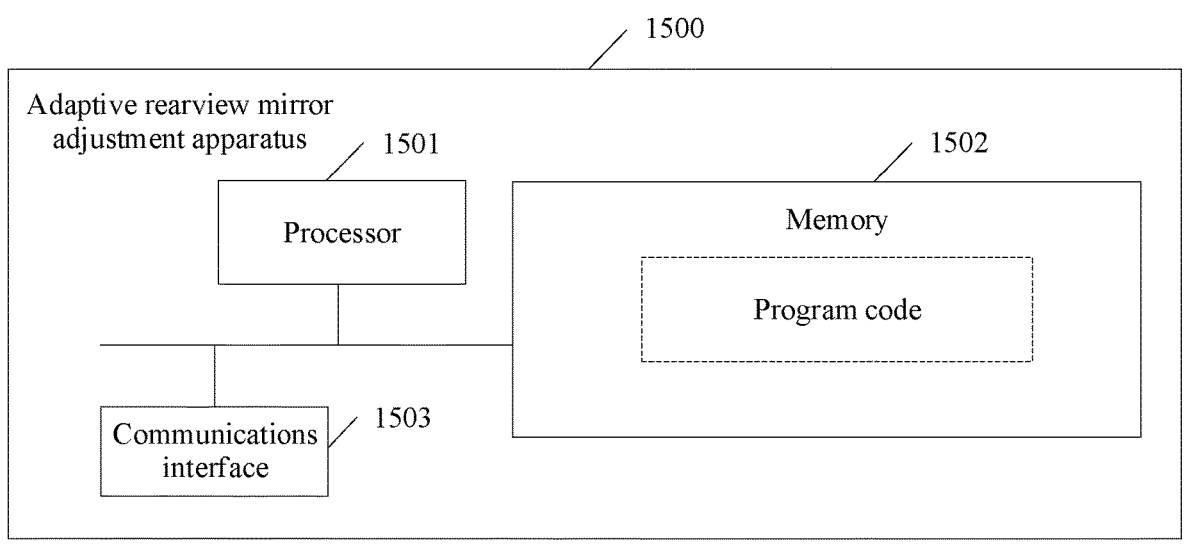
FIG. 15 is a schematic structural diagram of another adaptive rearview mirror adjustment apparatus according to an embodiment of this application.

As shown in FIG. 15, an adjustment apparatus 1500 may be implemented using a structure in FIG. 15. The adjustment apparatus 1500 includes at least one processor 1501, at least one memory 1502, and at least one communications interface 1503. The processor 1501, the memory 1502, and the communications interface 1503 are connected and communicate with each other using the communications bus.

The processor 1501 may be a general-purpose CPU, a microprocessor, an ASIC, or one or more integrated circuits configured to control program execution of the foregoing solution.

The communications interface 1503 is configured to communicate with another device or a communications network such as the Ethernet, a radio access network (RAN), or a wireless local area network (WLAN).

The memory 1502 may be but is not limited to: a read-only memory (read-only memory, ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a blue-ray disc, or the like), a magnetic disk storage medium or another magnetic storage device, or any other medium that can be used to carry or store expected program code in an instruction or data structure form and can be accessed by a computer. The memory may exist independently, and is connected to the processor using the bus. Alternatively, the memory may be integrated with the processor.

The memory 1502 is configured to store application program code used to perform the foregoing solution, and the execution is controlled by the processor 1501. The processor 1501 is configured to execute the application program code stored in the memory 1502.

The code stored in the memory 1502 may be used to perform the adaptive rearview mirror adjustment method provided in FIG. 2, for example: obtaining a spatial position of a human eye of a driver of a current vehicle and a spatial position of a target rearview mirror, and obtaining a horizontal field of view of the driver in the target rearview mirror based on the spatial position of the human eye and the spatial position of the target rearview mirror; obtaining a next-vehicle image, and obtaining a first auxiliary angle of a target next vehicle based on the next-vehicle image, where the first auxiliary angle is an angle formed between a first straight line and a second straight line, the first straight line is a straight line passing through the target next vehicle and a first reference point, the second straight line is a straight line that passes through the first reference point and that is perpendicular to the target rearview mirror, the first reference point is a point on the target rearview mirror, the next-vehicle image is obtained by a rearview camera, and the next-vehicle image includes the target next vehicle; calculating a second auxiliary angle based on the horizontal field of view, the spatial position of the human eye, and the position of the target rearview mirror, where the second auxiliary angle is an angle formed between a third straight line and a center line of a horizontal view, the third straight line is a straight line passing through the position of the human eye of the driver and a second reference point, and the second reference point is an intersection between the center line of the horizontal view and a mirror surface of the target rearview mirror; obtaining a horizontal adjustment angle of the target rearview mirror based on the first auxiliary angle and the second auxiliary angle; and adjusting a horizontal angle of the target rearview mirror based on the horizontal adjustment angle.

It should be noted herein that the adjusting, by the processor, a horizontal angle of the target rearview mirror based on the horizontal adjustment angle may be directly controlling, by the processor, the target rearview mirror based on the horizontal adjustment angle, to adjust the horizontal angle of the target rearview mirror, or sending, by the processor, a control instruction to a control apparatus of the target rearview mirror, to instruct the control apparatus to adjust the horizontal angle of the target rearview mirror based on the horizontal adjustment angle.

Figure 16:
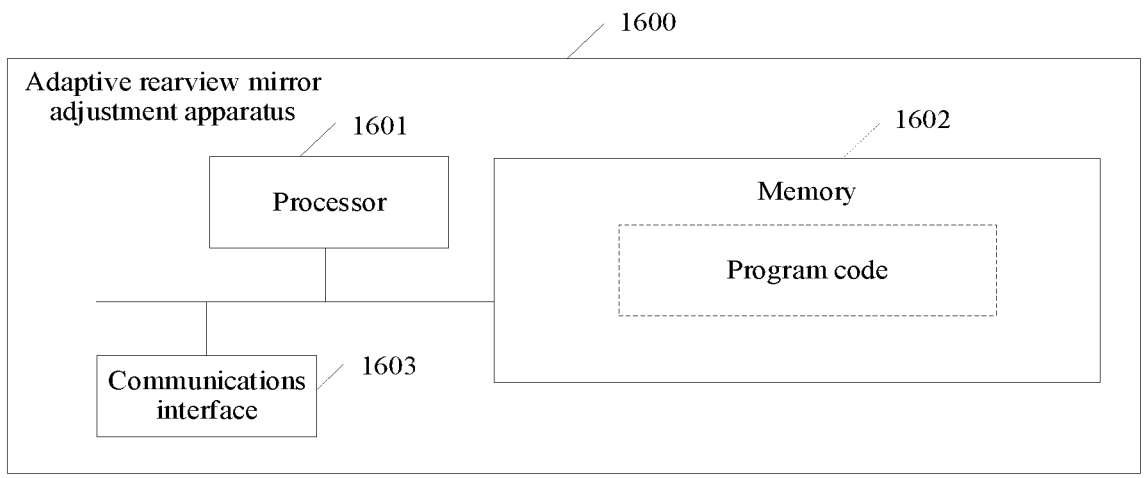
FIG. 16 is a schematic structural diagram of another adaptive rearview mirror adjustment apparatus according to an embodiment of this application.

As shown in FIG. 16, an adjustment apparatus 1600 may be implemented using a structure in FIG. 16. The adjustment apparatus 1600 includes at least one processor 1601, at least one memory 1602, and at least one communications interface 1603. The processor 1601, the memory 1602, and the communications interface 1603 are connected and communicate with each other using the communications bus.

The processor 1601 may be a general-purpose CPU, a microprocessor, an ASIC, or one or more integrated circuits configured to control program execution of the foregoing solution.

The communications interface 1603 is configured to communicate with another device or a communications network such as the Ethernet, a radio access network (RAN), or a wireless local area network (WLAN).

The memory 1602 may be but is not limited to a ROM or another type of static storage device capable of storing static information and instructions, a RAM or another type of dynamic storage device capable of storing information and instructions, an EEPROM, a CD-ROM or another compact disc storage, an optical disc storage (including a compact disc, a laser disc, an optical disc, a digital versatile disc, and a blue-ray disc, or the like), a magnetic disk storage medium or another magnetic storage device, or any other medium that can be used to carry or store expected program code in an instruction or data structure form and can be accessed by a computer. The memory may exist independently, and is connected to the processor using the bus. Alternatively, the memory may be integrated with the processor.

The memory 1602 is configured to store application program code used to perform the foregoing solution, and the execution is controlled by the processor 1601. The processor 1601 is configured to execute the application program code stored in the memory 1602.

The code stored in the memory 1602 may be used to perform another adaptive rearview mirror adjustment method provided in FIG. 7 or FIG. 10, for example: obtaining a spatial position of a human eye of a driver and a spatial position of a target rearview mirror of a current vehicle, and obtaining a vertical field of view based on the spatial position of the human eye and the spatial position of the target rearview mirror; calculating an auxiliary adjustment angle of the current vehicle based on the spatial position of the human eye of the driver and the vertical field of view, where the auxiliary adjustment angle of the current vehicle is an angle formed between a center line of a vertical view and a fifth straight line; obtaining a next-vehicle image captured by a rearview camera of the current vehicle, and obtaining a sky-to-ground ratio R based on the next-vehicle image; and obtaining a vertical adjustment angle of the target rearview mirror based on the auxiliary adjustment angle of the current vehicle and the sky-to-ground ratio R, and adjusting the target rearview mirror to a target vertical angle based on the vertical adjustment angle, where the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view, or obtaining a next-vehicle image captured by a rearview camera of a current vehicle; converting the next-vehicle image into a grayscale image, and calculating an average value of pixels in the grayscale image; and if the average value is not less than a preset value, obtaining a spatial position of a human eye of a driver of the current vehicle and a spatial position of a target rearview mirror of the current vehicle, and obtaining a vertical field of view based on the spatial position of the human eye and the spatial position of the target rearview mirror; calculating an auxiliary adjustment angle of the current vehicle based on the spatial position of the human eye of the driver and the vertical field of view, where the auxiliary adjustment angle of the current vehicle is an angle formed between a center line of a vertical view and a fifth straight line; obtaining a sky-to-ground ratio R based on the next-vehicle image; and obtaining a vertical adjustment angle of the target rearview mirror based on the auxiliary adjustment angle of the current vehicle and the sky-to-ground ratio R, and adjusting the target rearview mirror to a target vertical angle based on the vertical adjustment angle, where the fifth straight line is an angle formed between a straight line passing through the spatial position of the human eye of the driver and a third reference point and the center line of the vertical view, the third reference point is a point on the target rearview mirror, and the center line of the vertical view is an angle bisector of the vertical field of view.

It should be noted herein that the adjusting, by the processor, the target rearview mirror to a target vertical angle based on the vertical adjustment angle may be directly controlling, by the processor, the target rearview mirror based on the vertical adjustment angle, to adjust a vertical angle of the target rearview mirror to the target vertical angle, or sending, by the processor, a control instruction to a control apparatus of the target rearview mirror, to instruct the control apparatus to adjust a vertical angle of the target rearview mirror to the target vertical angle based on the vertical adjustment angle.

An embodiment of the present application further provides a computer storage medium. The computer storage medium may store a program, and when the program is executed, at least a part or all of the steps of any adaptive rearview mirror adjustment method in the foregoing method embodiments may be performed.

Figure 17:
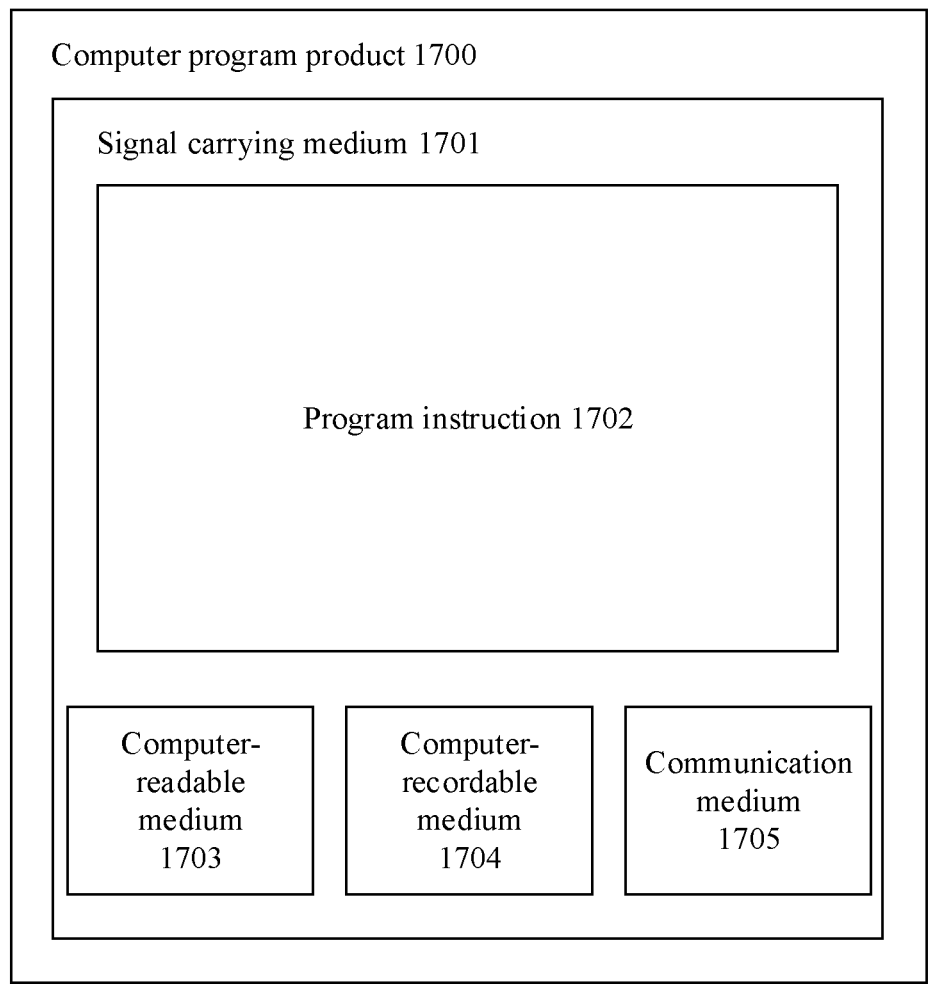
FIG. 17 is a schematic structural diagram of a computer program product according to an embodiment of this application.

Program Product Embodiment:

In some embodiments, the disclosed method may be implemented as a computer program instruction encoded in a machine-readable format on a computer-readable storage medium or on another non-transitory medium or article. FIG. 17 schematically shows a conceptual partial view of an example computer program product arranged according to at least some of the embodiments shown herein. The example computer program product includes a computer program for executing a computer process on a computing device. In an embodiment, the example computer program product 1700 is provided using a signal carrying medium 1701. The signal carrying medium 1701 may include one or more program instructions 1702, which, when executed by one or more processors, may provide functions or some functions described above with respect to FIG. 2, FIG. 7, or FIG. 10. In addition, the program instruction 1702 in FIG. 17 also describes an example instruction.

In some examples, the signal carrying medium 1701 may include a computer-readable medium 1703, for example but not limited to, a hard disk drive, a compact disk (CD), a digital video disc (DVD), a digital tape, a memory, a ROM, or a RAM. In some implementations, the signal carrying medium 1701 may include a computer-recordable medium 1704, for example but not limited to, a memory, a read/write (R/W) CD, or an R/W DVD. In some implementations, the signal carrying medium 1701 may include a communication medium 1705, for example but not limited to, digital and/or analog communication medium (for example, an optical fiber, a waveguide, a wired communication link, or a wireless communication link). Therefore, for example, the signal carrying medium 1701 may communicate by the communication medium 1705 in a wireless form (for example, a wireless communication medium that complies with the Institute of Electrical and Electronics Engineers (IEEE) 802.11 standard or another transmission protocol). The one or more program instructions 1702 may be, for example, a computer-executable instruction or a logic implementation instruction. In some examples, a computing device such as that described with respect to FIG. 2, FIG. 7, or FIG. 10 may be configured to provide various operations, functions, or actions in response to the program instruction 1702 communicated to the computing device using one or more of the computer-readable medium 1703, the computer recordable medium 1704, and/or the communication medium 1705. It should be understood that the arrangement described herein is only for an example purpose. Therefore, a person skilled in the art will appreciate that other arrangements and other elements (for example, machines, interfaces, functions, sequences, and groups of functions) can be used instead, and some elements may be omitted depending on an expected result. In addition, many of the described elements are functional entities that may be implemented as discrete or distributed components, or implemented in any suitable combination and position in conjunction with other components.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are example embodiments, and the related actions and modules are not necessarily mandatory to the present application.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division during implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one position, or may be distributed on a plurality of network units. Some or all of the units may be selected based on requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present application essentially, or the part contributing to the technical solutions, or all or some of the technical solutions may be implemented in a form of a software product. The software product is stored in a storage and includes several instructions for indicating a computer device (which may be a personal computer, a server, a network device, or the like) to perform all or some of the steps of the methods described in the embodiments of the present application. The foregoing storage medium includes any medium that can store program code, such as a universal serial bus (USB) flash drive, a ROM, a RAM, a removable hard disk, a magnetic disk, or an optical disc.

A person of ordinary skill in the art may understand that all or some of the steps of the methods in the embodiments may be implemented by a program indicating related hardware. The program may be stored in a computer-readable storage medium. The storage medium may include a flash memory, a ROM, a RAM, a magnetic disk, and an optical disc.

The embodiments of the present application are described in detail above. The principle and implementation of the present application are described herein through specific examples. The description about the embodiments of the present application is merely provided to help understand the method and core ideas of the present application. In addition, a person of ordinary skill in the art can make variations to the present application in terms of the specific implementations and application scopes according to the ideas of the present application. Therefore, the content of specification shall not be construed as a limit to the present application.

What is claimed is:

1. An adaptive rearview mirror adjustment method, comprising:
    obtaining a spatial position of a human eye of a driver of a current vehicle and a spatial position of a target rearview mirror of the current vehicle;
    obtaining a horizontal view field of the driver in the target rearview mirror based on the spatial position of the human eye and the spatial position of the target rearview mirror;
    calculating a first auxiliary angle based on the horizontal view field, the spatial position of the human eye, and the spatial position of the target rearview mirror;
    obtaining a horizontal adjustment angle of the target rearview mirror based on the first auxiliary angle and a second auxiliary angle; and
    adjusting a horizontal angle of the target rearview mirror based on the horizontal adjustment angle.

2. The adaptive rearview mirror adjustment method of claim 1, further comprising:
    obtaining a next-vehicle image through a rearview camera of the current vehicle, wherein the next-vehicle image comprises a target next vehicle; and
    obtaining the second auxiliary angle based on the next-vehicle image and a first reference point on the target rearview mirror.

3. The adaptive rearview mirror adjustment method of claim 2, wherein the second auxiliary angle is an angle formed between a first straight line and a second straight line, wherein the first straight line passes through the target next vehicle and the first reference point, wherein the second straight line passes through the first reference point and is perpendicular to the target rearview mirror, wherein the first auxiliary angle is an angle formed between a third straight line and a horizontal-view center line, wherein the third straight line passes through the spatial position of the human eye of the driver and a second reference point, wherein the second reference point is an intersection between the horizontal-view center line and a mirror surface of the target rearview mirror, and wherein the horizontal-view center line is an angle bisector of the horizontal view field.

4. The adaptive rearview mirror adjustment method of claim 1, further comprising:
    obtaining a vertical view field of the driver in the target rearview mirror based on the spatial position of the human eye and the spatial position of the target rearview mirror;
    obtaining a vertical adjustment angle of the target rearview mirror based on the first auxiliary angle and a sky-to-ground ratio R; and
    adjusting a vertical angle of the target rearview mirror based on the vertical adjustment angle.

5. The adaptive rearview mirror adjustment method of claim 4, further comprising:
    obtaining a next-vehicle image through a rearview camera of the current vehicle, wherein the next-vehicle image comprises a target next vehicle; and
    obtaining the sky-to-ground ratio R based on the next-vehicle image.

6. The adaptive rearview mirror adjustment method of claim 5, wherein the first auxiliary angle is an angle formed between a vertical-view center line and a fifth straight line, wherein the fifth straight line passes through the spatial position of the human eye of the driver and a third reference point, wherein the third reference point is a point on the target rearview mirror, and wherein the vertical-view center line of the vertical view is an angle bisector of the vertical view field.

7. The adaptive rearview mirror adjustment method of claim 5, wherein obtaining the sky-to-ground ratio R comprises:
    dividing the next-vehicle image longitudinally into a plurality of image strips;
    obtaining a target image strip from the plurality of image strips, wherein the target image strip is an image strip with continuous transition between sky and ground in the plurality of image strips;
    counting a quantity of pixels occupied by the sky and a quantity of pixels occupied by the ground in the target image strip; and
    calculating the sky-to-ground ratio R based on the quantity of pixels occupied by the sky and the quantity of pixels occupied by the ground, wherein the sky-to-ground ratio R is a ratio of the quantity of pixels occupied by the sky to the quantity of pixels occupied by the ground.

8. An adaptive rearview mirror adjustment apparatus, comprising:
    a memory configured to store instructions; and
    a processor coupled to the memory, wherein the instructions when executed by the processor cause the adaptive rearview mirror adjustment apparatus to:
        obtain a spatial position of a human eye of a driver of a current vehicle and a spatial position of a target rearview mirror of the current vehicle;
        obtain a horizontal view field of the driver in the target rearview mirror based on the spatial position of the human eye and the spatial position of the target rearview mirror;
        calculate a first auxiliary angle based on the horizontal view field, the spatial position of the human eye, and the spatial position of the target rearview mirror;
        obtain a horizontal adjustment angle of the target rearview mirror based on the first auxiliary angle and a second auxiliary angle; and adjust a horizontal angle of the target rearview mirror based on the horizontal adjustment angle.

9. The adaptive rearview mirror adjustment apparatus of claim 8, wherein the instructions further cause the adaptive rearview mirror adjustment apparatus to:
obtain a next-vehicle image through a rearview camera of the current vehicle, wherein the next-vehicle image comprises a target next vehicle; and
obtain the second auxiliary angle based on the next-vehicle image and a first reference point on the target rearview mirror.

10. The adaptive rearview mirror adjustment apparatus of claim 9, wherein the second auxiliary angle is formed between a first straight line and a second straight line, wherein the first straight line passes through the target next vehicle and the first reference point, wherein the second straight line passes through the first reference point and is perpendicular to the target rearview mirror, wherein the first auxiliary angle is formed between a third straight line and a horizontal-view center line, wherein the third straight line passes through the spatial position of the human eye of the driver and a second reference point, wherein the second reference point is an intersection between the horizontal-view center line and a mirror surface of the target rearview mirror, and wherein the horizontal-view center line is an angle bisector of the horizontal view field.

11. The adaptive rearview mirror adjustment apparatus of claim 9, wherein the next-vehicle image comprises M vehicles, wherein M is an integer greater than or equal to 1, and wherein the instructions further cause the adaptive rearview mirror adjustment apparatus to:
obtain a vehicle box and an offset of the target next vehicle based on the next-vehicle image, wherein the offset is a distance between a center position of a front face of target next vehicle in the next-vehicle image and a longitudinal center line of the next-vehicle image, and wherein the vehicle box is a quantity of pixels occupied by a contour of the target next vehicle in the next-vehicle image;
obtain a vehicle distance d based on the offset and the vehicle box of the target next vehicle, wherein the vehicle distance d is a distance between the front face of the target next vehicle and a rear of the current vehicle;
obtain a third auxiliary angle based on the vehicle distance d and the offset of the target next vehicle, wherein the third auxiliary angle is an angle between a fourth straight line and a transverse center line of the current vehicle, and wherein the fourth straight line is a straight line passing through a position of the rearview camera and the center position of the front face of the target next vehicle; and
obtain the second auxiliary angle based on the third auxiliary angle and the vehicle distance d of the target next vehicle,
wherein when M is equal to 1, the target next vehicle is a next vehicle in the next-vehicle image or when M is greater than 1, the target next vehicle is a next vehicle with a highest importance probability in the M next vehicles in the next-vehicle image.

12. The adaptive rearview mirror adjustment apparatus of claim 8, wherein the instructions further cause the adaptive rearview mirror adjustment apparatus to:
search a relationship table based on the first auxiliary angle and the second auxiliary angle; and
obtain the horizontal adjustment angle corresponding to the first auxiliary angle and the second auxiliary angle based on searching the relationship table, wherein the relationship table includes a correspondence between the first auxiliary angle, the second auxiliary angle, and the horizontal adjustment angle.

13. The adaptive rearview mirror adjustment apparatus of claim 8, wherein the instructions further cause the adaptive rearview mirror adjustment apparatus to:
obtain a vertical view field of the driver in the target rearview mirror based on the spatial position of the human eye and the spatial position of the target rearview mirror;
obtain a vertical adjustment angle of the target rearview mirror based on the first auxiliary angle and a sky-to-ground ratio R; and
adjust a vertical angle of the target rearview mirror based on the vertical adjustment angle.

14. The adaptive rearview mirror adjustment apparatus of claim 13, wherein the instructions further cause the adaptive rearview mirror adjustment apparatus to:
obtain a next-vehicle image through a rearview camera of the current vehicle, wherein the next-vehicle image comprises a target next vehicle; and
obtain the sky-to-ground ratio R based on the next-vehicle image.

15. The adaptive rearview mirror adjustment apparatus of claim 14, wherein the first auxiliary angle is formed between a vertical-view center line and a fifth straight line, wherein the fifth straight line is a straight line passing through the spatial position of the human eye of the driver and a third reference point, wherein the third reference point is on the target rearview mirror, and wherein the vertical-view center line is an angle bisector of the vertical view field.

16. The adaptive rearview mirror adjustment apparatus of claim 14, wherein the instructions further cause the adaptive rearview mirror adjustment apparatus to:
divide the next-vehicle image longitudinally into a plurality of image strips;
obtain a target image strip from the plurality of image strips, wherein the target image strip is an image strip with continuous transition between sky and ground in the plurality of image strips;
count a quantity of pixels occupied by the sky and a quantity of pixels occupied by the ground in the target image strip; and
calculate the sky-to-ground ratio R based on the quantity of pixels occupied by the sky and the quantity of pixels occupied by the ground, wherein the sky-to-ground ratio R is a ratio of the quantity of pixels occupied by the sky to the quantity of pixels occupied by the ground.

17. The adaptive rearview mirror adjustment apparatus of claim 14, wherein the instructions further cause the adaptive rearview mirror adjustment apparatus to:
search an auxiliary relationship table based on the first auxiliary angle and the sky-to-ground ratio R; and
obtain the vertical adjustment angle corresponding to the first auxiliary angle and the sky-to-ground ratio R based on searching the auxiliary relationship table, wherein the auxiliary relationship table includes a correspondence between the first auxiliary angle, the sky-to-ground ratio R, and the vertical adjustment angle.

18. A computer program product comprising computer-executable instructions stored on a non-transitory computer-readable storage medium that when executed by a processor, cause an adaptive rearview mirror adjustment apparatus to:

obtain a spatial position of a human eye of a driver of a current vehicle and a spatial position of a target rearview mirror of the current vehicle;

obtain a horizontal view field of the driver in the target rearview mirror based on the spatial position of the human eye and the spatial position of the target rearview mirror;

calculate a first auxiliary angle based on the horizontal view field, the spatial position of the human eye, and the spatial position of the target rearview mirror;

obtain a horizontal adjustment angle of the target rearview mirror based on the first auxiliary angle and a second auxiliary angle; and adjust a horizontal angle of the target rearview mirror based on the horizontal adjustment angle.

19. The computer program product of claim 18, wherein the instructions that when executed by a processor further cause the adaptive rearview mirror adjustment apparatus to:

obtain a next-vehicle image through a rearview camera of the current vehicle, wherein the next-vehicle image comprises a target next vehicle; and obtain the second auxiliary angle based on the next-vehicle image and a first reference point on the target rearview mirror.

20. The computer program product of claim 19, wherein the second auxiliary angle is an angle formed between a first straight line and a second straight line, wherein the first straight line passes through the target next vehicle and the first reference point, wherein the second straight line passes through the first reference point and is perpendicular to the target rearview mirror, wherein the first auxiliary angle is an angle formed between a third straight line and a horizontal-view center line, wherein the third straight line passes through the spatial position of the human eye of the driver and a second reference point, wherein the second reference point is an intersection between the horizontal-view center line and a mirror surface of the target rearview mirror, and wherein the horizontal-view center line is an angle bisector of the horizontal view field.

* * * * *